(12) United States Patent
Kramer et al.

(10) Patent No.: US 6,327,574 B1
(45) Date of Patent: Dec. 4, 2001

(54) HIERARCHICAL MODELS OF CONSUMER ATTRIBUTES FOR TARGETING CONTENT IN A PRIVACY-PRESERVING MANNER

(75) Inventors: Glenn A. Kramer; Mark B. Vogel, both of San Francisco, CA (US)

(73) Assignee: Encirq Corporation, San Francisco, CA (US)

( * ) Notice: Subject to any disclaimer, the term of this patent is extended or adjusted under 35 U.S.C. 154(b) by 0 days.

(21) Appl. No.: 09/241,546

(22) Filed: Feb. 1, 1999

Related U.S. Application Data

(63) Continuation-in-part of application No. 09/235,610, filed on Jan. 20, 1999
(60) Provisional application No. 60/091,979, filed on Jul. 7, 1998.

(51) Int. Cl.[7] .................................... G06F 17/30
(52) U.S. Cl. .................. 705/14; 705/10; 705/26
(58) Field of Search .................. 705/10, 26, 14; 707/500, 501, 502, 503, 504, 542

(56) References Cited

U.S. PATENT DOCUMENTS

| | | | |
|---|---|---|---|
| 4,813,077 | 3/1989 | Woods et al. | 382/7 |
| 5,173,851 | 12/1992 | Off et al. | 364/401 |
| 5,241,671 | * 8/1993 | Reed et al. | 705/104 |
| 5,317,507 | * 5/1994 | Gallant | 707/532 |
| 5,614,927 | 3/1997 | Gifford et al. | |
| 5,619,709 | * 4/1997 | Caid et al. | 707/532 |
| 5,721,827 | 2/1998 | Logan et al. | 395/200.47 |
| 5,724,424 | 3/1998 | Gifford | 380/24 |
| 5,724,521 | * 3/1998 | Dedrick | 705/26 |
| 5,740,549 | 4/1998 | Reilly et al. | 705/14 |
| 5,794,178 | * 9/1998 | Caid et al. | 704/9 |

(List continued on next page.)

FOREIGN PATENT DOCUMENTS

| | | | | |
|---|---|---|---|---|
| WO 97/16796 A1 | * 5/1997 | (WO) | | G06F/17/30 |
| WO 97/21183 | 6/1997 | (WO) | | G06F/15/00 |
| WO 97/41540 | 11/1997 | (WO) | | G07F/7/10 |
| WO 97/41673 | 11/1997 | (WO) | | H04L/29/06 |

OTHER PUBLICATIONS

Mendenhall, William. "Introduction to Probability and Statistics" 7d. (Boston: Duxbury Press, 1979) pp. 93–95 & 112–114.*

(List continued on next page.)

*Primary Examiner*—Stephen Gravini
*Assistant Examiner*—John Leonard Young
(74) *Attorney, Agent, or Firm*—Fenwick & West LLP

(57) ABSTRACT

A system and method provide for the interpretation and augmenting of structured documents electronically delivered to an individual consumer's computer using consumer profiles developed from and maintained with information reflecting the consumer's online and offline transactions, by selecting the variable content alternatives encoded in the structured documents that most closely match the consumer's profile. The consumer profiles are logically controlled by the consumer's computer, thus providing for enhanced security over information that is personal and confidential to the consumer, yet still allowing third parties such as web sites and others electronically delivering structured documents to the consumer to have such documents customized based on the consumer's profile. The consumer profile includes hierarchical attribute vectors which encode attributes of a consumer at progressively higher levels of abstraction, and allowing for querying of any combination of abstracted data or abstracted attributes of a consumer. The consumer profiles are updated with a process that reflects the relevance of each transaction to the consumer's profile, and accommodates a decay in the influence of transactions over time. A selection process for selecting content allows for multiple items of content to be selected for sequenced display to the consumer, through a limited presentation space.

32 Claims, 18 Drawing Sheets

U.S. PATENT DOCUMENTS

| | | | |
|---|---|---|---|
| 5,832,457 | 11/1998 | O'Brien et al. | 705/14 |
| 5,892,827 | 4/1999 | Beach et al. | 380/24 |
| 5,933,811 | 8/1999 | Angles et al. | 705/14 |
| 5,948,061 | 9/1999 | Merriman et al. | 709/219 |
| 6,026,370 | 2/2000 | Jermyn | 705/14 |
| 6,112,186 * | 8/2000 | Bergh et al. | 705/10 |
| 6,134,532 * | 10/2000 | Lazarus et al. | 705/14 |

OTHER PUBLICATIONS

Booker, E.; "Seeing a Gap, A Palo Alto Startup Will Debut Advertising Server for the Net", Web Week, v.2 iss2. [online] retrieved from www.interntworld.com. (1996).

Metcalfe, B.; "From the Ether", InfoWorld, v.18 iss3, [online] retrieved from www.infoworld.com. (1996).

Netgravity AdServer 2.0 Announcement. [online] retrieved from www.netgravity.com (1996).

Internet access: internet marketing revolution begins in the US this Sep., Edge: Work–Group Computing Report, v7 n316, (1996).

Kodha, Y. et al; Ubiquitous Advertising on the WWW: Merging Advertisement on the Browser, Computer Networks and ISDN Systems, vol. 28, No. 11, May 1996, pp. 1493–1499.

The Brodia Group, 38 pages [online], retrieved on May 17, 2000 from www.brodia.com.

Catalina Marketing Corporation, 25 pages, [online], retrieved on May 17, 2000 from www.catmktg.com.

Engage Technologies, Inc., 22 pages, [online], retrieved on Feb. 14, 2000 from www.engage.com.

Gator.com, User's Guide to Gator, Version 1.2, 21 pages, [online], retrieved on Feb. 14, 2000 from www.gator.com, publication date unknown.

Gator.com, Company Information, 23 pages, [online], retrieved on Feb. 14, 2000 from Internet, publication date unknown.

Metabyte Networks, Inc., 19 pages, [online], retrieved on May 17, 2000 from www.metabyte.com.

Privaseek, Inc., 15 pages, [online], retrieved on May 17, 2000 from www.privaseek.com.

* cited by examiner

```
                                                            ┌─300
┌─────────────────────────────────────────────────────────────────────────┐
│ 11/16/97  G847MHC2  MACY*S WEST #049        CERRITOS       CA   $16.23  │
│ 11/17/97  MK21VFXM  HERTZ CORPORATION       LOS ANGELES    CA   $77.11  │
│ 11/18/97  6LD23PMD  CHEVRON #0092841        SAN FRANCISCO  CA   $28.01  │
│ 11/20/97  0CTVX1D2  CIRCUIT CITY SS #0253   DALY CITY      CA  $108.24  │
│ 12/01/97  H5QQ46Q0  PEAPOD MONTHLY USAGE F  TEL8005732763  IL   $35.00  │
│ 12/05/97  861J4BC3  DINE ONE ONE            800-434-6311   CA   $36.96  │
│⌐12/06/97  NDNKG*N9  SAFEWAY                 SAN FRANCISCO  CA   $71.62  │
└─────────────────────────────────────────────────────────────────────────┘
302
```

FIG. 3A

AFTER ILLUMINATION

FIG. 3B

| Preference for shopping at Williams-Sonoma if interested in cooking $P(d \mid x)$ | Preference for shopping at Williams-Sonoma if not interested in cooking $P(d \mid \sim x)$ | Transaction number (where 0 = initial estimate) | Interest in cooking given a transaction at Williams-Sonoma $P(x)$ |
|---|---|---|---|
| | | 0 | 0.001 |
| 0.1 | 0.02 | 1 | 0.005 |
| 0.1 | 0.02 | 2 | 0.024 |
| 0.1 | 0.02 | 3 | 0.111 |
| 0.1 | 0.02 | 4 | 0.385 |
| 0.1 | 0.02 | 5 | 0.758 |
| 0.1 | 0.02 | 6 | 0.940 |
| 0.1 | 0.02 | 7 | 0.987 |
| 0.1 | 0.02 | 8 | 0.997 |

FIG. 11A

| Preference for renting a car if interested in travel $P(d \mid x)$ | Preference for renting a car if not interested in travel $P(d \mid \sim x)$ | Transaction number (where 0 = initial estimate) | Interest in travel given a transaction involving renting a car $P(x)$ |
|---|---|---|---|
| | | 0 | 0.001 |
| 0.5 | 0.05 | 1 | 0.010 |
| 0.5 | 0.05 | 2 | 0.091 |
| 0.5 | 0.05 | 3 | 0.500 |
| 0.5 | 0.05 | 4 | 0.909 |
| 0.5 | 0.05 | 5 | 0.990 |
| 0.5 | 0.05 | 6 | 0.999 |
| 0.5 | 0.05 | 7 | 1.000 |
| 0.5 | 0.05 | 8 | 1.000 |

FIG. 11B

| Preference for no cooking store transactions if interested in cooking $P(n \mid x)$ | Preference for no cooking store transactions if not interested in cooking $P(n \mid \sim x)$ | Preference for shopping at Williams-Sonoma if interested in cooking $P(d \mid x)$ | Preference for shopping at Williams-Sonoma if not interested in cooking $P(d \mid \sim x)$ | Period (where 0 = initial estimate) | Interest in cooking given a transaction at Williams-Sonoma $P(x)$ |
|---|---|---|---|---|---|
|  |  |  |  | 0 | 0.001 |
|  |  | 0.1 | 0.02 | 1 | 0.005 |
|  |  | 0.1 | 0.02 | 2 | 0.024 |
| 0.9 | 0.98 |  |  | 3 | 0.022 |
|  |  | 0.1 | 0.02 | 4 | 0.103 |
|  |  | 0.1 | 0.02 | 5 | 0.365 |
| 0.9 | 0.98 |  |  | 6 | 0.345 |
| 0.9 | 0.98 |  |  | 7 | 0.326 |
|  |  | 0.1 | 0.02 | 8 | 0.708 |

FIG. 12A

| Preference for no car rental transactions if interested in travel $P(n \mid x)$ | Preference for no car rental transactions if not interested in travel $P(n \mid \sim x)$ | Preference for renting a car if interested in travel $P(d \mid x)$ | Preference for renting a car if not interested in travel $P(d \mid \sim x)$ | Period (where 0 = initial estimate) | Interest in travel given a transaction involving renting a car $P(x)$ |
|---|---|---|---|---|---|
|  |  |  |  | 0 | 0.001 |
|  |  | 0.5 | 0.05 | 1 | 0.010 |
|  |  | 0.5 | 0.05 | 2 | 0.091 |
|  |  | 0.5 | 0.05 | 3 | 0.500 |
|  |  | 0.5 | 0.05 | 4 | 0.909 |
| 0.9 | 0.99 |  |  | 5 | 0.901 |
| 0.9 | 0.99 |  |  | 6 | 0.892 |
| 0.9 | 0.98 |  |  | 7 | 0.883 |
| 0.9 | 0.98 |  |  | 8 | 0.872 |

| | | P(s \| xi) | P(s \| ~xi) | P(v \| xi) | P(v \| ~xi) | P(n \| xi) | P(n \| ~xi) | Initial values for preferences | Preference values at end of period 1, containing one purchase at Sportsmart | Preference values at end of period 2, containing no sports-related purchases | Preference values at end of period 3, containing one purchase at VolleyballWorld |
|---|---|---|---|---|---|---|---|---|---|---|---|
| x 1 | basketball | 0.1 | 0.02 | | | 0.9 | 0.98 | 0.010 | 0.048 | 0.044 | 0.041 |
| x 2 | baseball | 0.1 | 0.02 | | | 0.9 | 0.98 | 0.010 | 0.048 | 0.044 | 0.041 |
| x 3 | football | 0.1 | 0.02 | | | 0.9 | 0.98 | 0.010 | 0.048 | 0.044 | 0.041 |
| x 4 | volleyball | 0.1 | 0.02 | 0.25 | 0.01 | 0.9 | 0.98 | 0.010 | 0.048 | 0.044 | 0.537 |
| x 5 | tennis | 0.1 | 0.02 | | | 0.9 | 0.98 | 0.010 | 0.048 | 0.044 | 0.041 |
| x | weighted sum indicating interest in sports/general | | | | | | | 0.010 | 0.048 | 0.044 | 0.140 |

FIG. 13B

| | | P(s \| xi) | P(s \| ~xi) | P(v \| xi) | P(v \| ~xi) | P(n \| xi) | P(n \| ~xi) | Initial values for preferences | Preference values at end of period 1, containing one purchase at VolleyballWorld | Preference values at end of period 2, containing no sports-related purchases | Preference values at end of period 3, containing one purchase at Sportsmart |
|---|---|---|---|---|---|---|---|---|---|---|---|
| x 1 | basketball | 0.1 | 0.02 | | | 0.9 | 0.98 | 0.010 | 0.009 | 0.008 | 0.041 |
| x 2 | baseball | 0.1 | 0.02 | | | 0.9 | 0.98 | 0.010 | 0.009 | 0.008 | 0.041 |
| x 3 | football | 0.1 | 0.02 | | | 0.9 | 0.98 | 0.010 | 0.009 | 0.008 | 0.041 |
| x 4 | volleyball | 0.1 | 0.02 | 0.25 | 0.01 | 0.9 | 0.98 | 0.010 | 0.202 | 0.188 | 0.537 |
| x 5 | tennis | 0.1 | 0.02 | | | 0.9 | 0.98 | 0.010 | 0.009 | 0.008 | 0.041 |
| x | weighted sum indicating interest in sports/general | | | | | | | 0.010 | 0.048 | 0.044 | 0.140 |

HIERARCHICAL MODELS OF CONSUMER ATTRIBUTES FOR TARGETING CONTENT IN A PRIVACY-PRESERVING MANNER

CROSS REFERENCE TO RELATED APPLICATION

This application is a continuation-in-part of U.S. application Ser. No. 09/235,610, filed Jan. 20, 1999, which claims the benefit of U.S. Provisional Application Ser. No. 60/091,979, filed Jul. 7, 1998.

BACKGROUND

1. Field of the Invention

The present invention relates to the creation and maintenance of models of consumers, based upon transactional data extracted from structured information received via electronic channels and viewed by the consumer, and the use of those models to aid in presenting targeted content, such as advertising or special offers, in a way that does not compromise the consumer's privacy.

2. Background

Consumers today receive a tremendous amount of information via electronic systems. Many consumers access the Internet or private networks to review information such as personal bank statements, credit card reports, stock portfolios, online account balances, online transaction receipts, commercial web sites, personal home pages, and the like. Some of this structured information reflects consumer behavior that occurs "off-line" such as credit card transactions made at retail establishments, debit, check or other bank transactions, while some of the structured information represents entirely online behavior (including both commercial and non-commercial behavior). Online behavior also includes behavior that is not directly commercial in nature, such as click-through behavior in using the Internet. This type of behavior is captured in structured documents such as URL (Uniform Resource Locator) history files stored on the user's computer.

A key goal of most businesses is to target consumers with products and services that is of interest to the consumer based on their interests, preferences, or demographics. Thus many attempts have been made to determine consumer's interests and provide content (e.g. promotions, advertisements) to products and services that match such interests.

Historically, for many types of their transactions, such as credit or banking transactions, consumers received printed statements from credit card companies, bank, and other financial institutions. The paper statement themselves typically only contain limited information identifying each transaction, its amount, date, and so forth. To enhance the advertising opportunities provided when the consumer is reviewing their printed statement, these institutions often add additional promotional insert documents to the statement, in the hope that the consumer will review these separate documents and be motivated to purchase the advertised products or services. Only limited targeting of the content of the advertising inserts has been possible in the past.

With the rise of consumer use of the Internet, advertisers have sought out ways to target promotional information to consumers viewing web pages and the like. On the World Wide Web, "banner" advertising is typically used to promote products or services to consumers viewing various web pages. Many web sites attempt to target banner advertising based on the content of a user's input, typically a search request, or other consumer input that is processed by the web site. However, targeting based on a single consumer input does not necessarily result in banner advertisements that actually are of interest to the consumer. This is because consumers frequently search for or desire information that is not necessarily related to their general interests, preferences, or demographics. Even when consumers are searching for information related to their interests, their online behavior may only reflect a small portion of their interests, and the relative importance of certain interests while online may be vastly different than the importance of the same interest when the consumer is off-line. Thus, online behavior may not be indicative of interests that are likely to lead to transactions being consummated online.

Some web sites attempt to target consumers by storing databases that contain some type of identifying data for each consumer. When a consumer accesses a web site coupled to the database, a targeted advertisement may be selected based on the consumer's data. However, this approach suffers from a loss of privacy to the consumer since personal information about some of their behaviors (typically only their click-throughs at the web site) are recorded, as this information is stored in the database without their consent or control. At present, the owner of the web site is typically free to use this consumer information as they see fit. In addition, the consumer information is often based on very limited information about the consumer that either does not accurately reflect their true interests and preferences or does not change automatically in response to both off-line and online consumer behavior. Furthermore, this information is normally limited to a consumer's prior interaction with that particular web site. While, new services are arising which attempt to share consumer information among unrelated websites, such mechanisms may violate consumer privacy and potentially consumer protection laws in various jurisdictions throughout the world.

Accordingly, it is desirable to provide a system, method, architecture and various software products that can augment structured documents that are received and reviewed online by a consumer using historical behavioral information about the consumer, including either online or off-line behavior, while ensuring the personal privacy of each consumer.

SUMMARY OF THE INVENTION

The present invention overcomes the limitations of conventional models and targeting methods for delivering custom content to consumers that matches their interests, preferences, demographics, or psychographics. Existing systems make use of data warehouses that aggregate information from a variety of sources, create demographic segments with associated consumer preferences, decide which segment or segments a consumer occupies, and sends information relevant to that segment to the consumer.

The present invention builds upon the analyzing or "interpreting" of structured documents delivered electronically to the consumer for information to create a consumer profile of the consumer based on a broad spectrum of both online and offline behaviors and transactions. In particular, a detailed model of the consumer is built using mathematical functions that map from the specific transactions of the consumer to estimates of the relevancy of certain attributes to the consumer. These models can be used to order a number of pieces of conditional content with respect to how well they match the attributes of the consumer, and hence how well they may appeal to the consumer's interests, preferences, psychographics, or demographics. Display methods in an illumination process, which augments structured documents being electronically delivered to the consumer with the conditional content, allow for the consumer to view the most appropriate piece of content first (by its ordering), followed by the next most appropriate piece of content if the consumer so indicates, and so forth. A content rotator may be used by a consumer to selectively view an ordered set of conditional content.

The consumer profile is continually updated with information extracted from electronically delivered structured documents and from consumer behavior such as selection of content, and thus reflects an accurate and current assessment of the consumer's interests, preferences, and demographics. The consumer profile may also be updated with information received about merchants, products, or consumer model parameters received from remote sources over a network. Changes in a consumer's interests, preferences, and demographics are assumed to be reflected by changes in their behaviors, as reflected through commercial and non-commercial transactions.

The consumer attributes may be defined in a hierarchical model, with aggregated attributes having values derived from lower level attributes (either themselves aggregated, or base level attributes). In this way arbitrarily complex queries can be evaluated against the model to target very specific consumers. The hierarchical model further allows recursive selection of conditional content, with initial selection of content using higher levels of aggregated attributes, and subsequent selection using a combination of lower levels of attributes on which the higher levels are based and consumer expression of interest in each level of selected content.

The consumer attributes are updated by the relevancy of individual transactions. Relative recency of transactions, and the probabilities of transactions occurring or not occurring may also be used to update the attributes.

One embodiment of the present invention, as described herein is an integrated system of software, knowledge bases, and processes which enables the following functionality:

- creation of a model consisting of a vector of data values, such that each of the values represents some attribute of the consumer: psychographic qualities, specific interest attributes, income level, etc., using facts in a consumer database of the consumer, plus a mathematical framework for interpreting the vector of values.
- grouping of elements of the model into a hierarchical framework that aids in a successive refinement of consumer attributes.
- the use of the database and models to target and personalize otherwise generic content delivered to the consumer in electronic form and including conditional content selected and ordered based on the consumer model, without the creator of the content having any knowledge of the consumer, his transactions or the results of models.
- presentation mechanisms for enabling the consumer to selectively view the conditional content according to its ordering.

BRIEF DESCRIPTION OF THE DRAWINGS

FIGS. 3A and 3B illustrate an illuminated credit card statement.

FIGS. 11a and 11b are tables illustrating updating of the attribute vector.

FIGS. 12a and 12b are tables illustrating updating of the attribute vector with decaying of older transactions.

FIGS. 13a and 13b are tables illustrating updating of the attribute vector including aggregated attributes.

FIG. 17 is an illustration of the effect of hierarchical discrimination of content.

FIG. 18 is another illustration of the effect of hierarchical discrimination of content.

DETAILED DESCRIPTION

A. Terminology

The present invention may be understood by use of the following terminology:

- A "consumer" is a person or organization that uses a commodity or service. In this context, it may be an individual or a collection of individuals acting as a consuming unit (e.g. a household, a company);
- A "transaction" is an event where some amounts of resources or information are exchanged between the consumer and a vendor (or content provider) at some particular time or over some particular time interval;
- A "model" is a mathematical function which attempts to predict the appeal to the consumer of future transactions based on interests and behavior derived from past transactions, and consists of an attribute vector and a set of mapping functions;
- An "attribute vector" is a vector of data values such that each element of the vector represents an attribute of the consumer;
- A "mapping function" is a mathematical function that is used to convert between factual information (such as data regarding a transaction or whether an individual is pregnant) and elements of an attribute vector;
- "Targeting" is the selection of what material to present to a viewer based on interests, needs, capabilities, and other attributes of the consumer and/or viewer;
- An "illumination" is a piece of targeted content, plus query information used to determine the degree to which the content matches the attributes of the consumer model.

B. System Overview

Figures 1, 2:
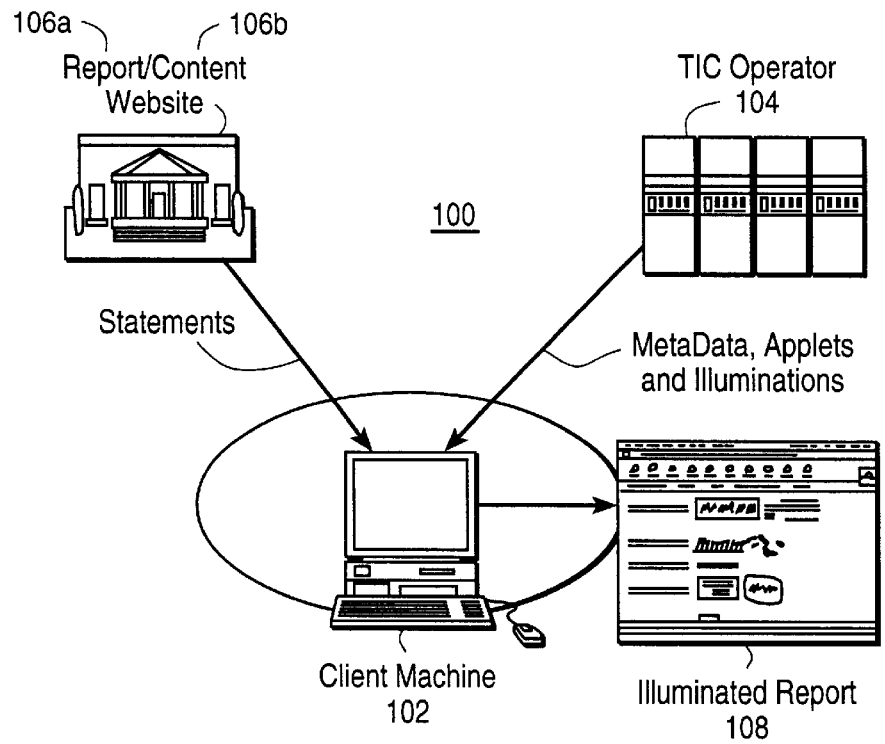
FIG. 1 is an illustration of a system in accordance with the present invention.
FIG. 2 is an illustration of a sample structured document.

Referring now to FIG. 1, there is shown one embodiment of a system in accordance with the present invention. The system 100 includes:

A local access device 102 with local memory, computing capability, persistent storage, a display, and a network connection (e.g. a personal computer with a modem connected to an Internet Service Provider or an intelligent television set-top box connected to a cable head-end).

One or more TIC enabled data servers 104 on the network which download software and provide generic information (i.e. information not specific to any particular consumer) that can be used to parse transactional or behavioral information in structured documents to construct the personal database, develop the models of the consumer and deliver pointers (or other references) to content alternatives whose selection is based on the consumer models or queries to the personal database.

One or more servers 106a which distribute online transaction reports whose format is known to the system.

One or more servers 106b which distribute content 108 which includes embedded tags and queries. A report server and content server may be one and the same, as illustrated in FIG. 1.

An embodiment of the present invention for use with the Internet is further described below with respect to FIG. 6.

C. Illumination and Interpretation

The present invention includes two major independent processes: interpretation and illumination.

Interpretation refers to the process of parsing and analyzing reports and other structured documents used by TIC to construct the personal database and models of the consumer. The data sources, on which the model is based, include any of the consumer's transaction reports which may be accessible to his local computing device either directly or via the network. Such reports may include credit card statements, bank statements, electronically presented bills, investment portfolios, medical reports, purchase receipts, tax forms, URL history files generated by the browser, forms filled in by the viewer and any other parsable and interpretable data about the consumer which may become available in electronic form. Since such reports provide generally accurate and very detailed data on a wide range of an individual's activities, both online and off-line, the models developed by TIC can be extremely accurate and complete.

Report formats, including information necessary for parsing the report data and using the data to update the user-model, may be self-describing, i.e. embedded as metadata in the form of annotation tags in the report itself, or indexed by report source in some globally accessible database managed by the TIC operator. Virtually any sufficiently structured document available to the user's device can serve as a data source for TIC. These could include databases, logs, and reports maintained and/or generated directly by the user himself or by software running on the user's computer. Examples include databases and reports generated by personal finances software, tax preparation software, loan applications, calendars, URL history files generated by web-browsers, listings of software residing on the user's computer, and reports of currently active processes and windows on the user's computer.

Because of the nature and level of detail of the information available in the TIC model, the user of TIC will require a high degree of privacy. The privacy that TIC provides is that no information collected, generated or inferred by TIC ever leaves the user's control. The data and inferences are used entirely on the user computer for the purpose of customizing and personalizing content for the user. With respect to TIC, personal information about the user only flows from external sources into the user computer (and the locally-controlled storage device). The user may use information presented by TIC to communicate back to content providers but that is done explicitly by the user independently of TIC.

Referring to FIG. 2, there is shown a pictorial example of an example structured document, here a credit card statement 200, and the types of information that may be usefully extracted during interpretation in order to update a consumer profile. For a structured document such as a credit card report, interpretation extracts information about each transaction 202, such as the date/time 204 of the transaction, the entity 206 with whom the transaction occurred, the location 206 of the transaction, and the amount of resources 210 (here measured in dollars) committed by the consumer to the transaction. The extracted information here can be used to both update the consumer model and to add new facts about the consumer's transactions, preferences, or interests to the database.

Illumination is the process of annotating or replacing sections of documents or other media with (possibly) related multimedia content. Typically the new content expands on the information in the original content and/or provides a more interesting presentation of the information. As examples, the name of a company or product might be illuminated with a graphical logo or a hyperlink to a home page, a video presentation, or a presentation for some completely different product or company; an input field in a form may be illuminated by replacing it with the information being requested; an empty spot in a video broadcast may be replaced with a commercial. The choice of illumination for a given section may depend on the content of the section, the overall content of the document, the choices made for illuminating other sections, the context such as time and location in which the content is being viewed and attributes or profile of the viewer. The illumination may occur at any point in the production and delivery process for the media. The degree of flexibility and context dependence in the choice of illumination will depend on how early or late in the process the illumination occurs and how much information about the context is available to the illuminator. This flexibility ranges from static content (i.e. content that is the same for all viewers and contexts) to viewer-specific content (i.e. content which may vary for each viewer).

FIGS. 3A and 3B illustrate an example illumination of a credit card statement. In FIG. 3A there is shown a credit card statement 300 as it would appear on a consumer's computer without the benefit of illumination according to the present invention. Such a statement 300 would be transmitted electronically from the computer system of a credit card company (or comparable financial institution) to the consumer's personal computer for review, and perhaps payment of outstanding balances. This statement 300 simply lists each transaction 302 as a simple line of text, with the normal descriptors of date, merchant name, transaction identifier, location, and amount. The opportunities for targeted advertising based on these individual transactions are wasted.

Now considering FIG. 3B, there is shown the credit card statement 304 after illumination in accordance with the present invention. First, many of the simple text-only merchant names have been replaced by graphic icons 307 illustrating the merchant's particular tradename or mark. This reinforces brand identity right at the point the consumer is reviewing a particular transaction with the merchant. Second, co-branding is facilitated by the inclusion in some transactions of a graphic icon 308 for second merchant's goods/services. For example, in the transaction line for the Chevron® charge, an icon 308 for Mercedes-Benz® cars is included. The selection of which second merchant's icon 308 to include in the transaction is based on the consumer's profile which is used to select one of a number of variable content alternatives that are encoded in the credit card statement when it is received electronically.

Third, illumination provides for the replacement of static text, such as the merchant's name, with a hyperlink 310 to the merchant's web site (or any other web site, as determined by the selectable content alternative data). Thus, here illumination transforms the otherwise static credit card statement into a dynamic document that allows the consumer to immediately access more information about a merchant during the process of reviewing the credit card statement.

Fourth, illumination provides for the insertion of promotional content 312 into specific transactions. In the illustrated example, a promotional coupon is for the product of merchant other than the merchant of the transaction. This facilitates co-marketing campaigns by groups of merchants. The selection of which merchant's coupons to include in the illuminated transaction are again based on the profile of the consumer and the attributes of each selectable content alternative that is encoded in the statement for this transaction. Thus, different consumers having a transaction with the same merchant may receive entirely different coupons 312 or co-branding icons 308 because of differences in their personal consumer profiles.

Finally, note that the top portion of the statement 304 has been augmented by the inclusion of a graphic icon 306 for yet another merchant, one who in this case does not have any transactions specifically listed with the consumer in the credit card statement. As is more fully described below, the selection of this icon 306, and other illumination elements (e.g. 307, 308, 310, and 312) may be usefully managed by policies associated with different sections of a structured document (e.g. the header portion, each transaction line, footer, etc.), and the structured document itself, where the document sections have respective owners which define the policies for illumination. The use of policies further extends the opportunities for controlled targeting of promotional information, since each section of a structured document may have policies that differently influence the selection of content alternatives relative to a consumer's profile.

The examples of FIGS. 3A and 3B illustrate illumination for a credit card statement; illumination can be applied to any type of structured document generally so long as it is formatted with the information describing the selectable content alternatives, in accordance with the present invention, including any type of financial statement generally (e.g. bank statements or stock portfolio statements), or transaction statement generally (e.g. commercial transactions with a service or product vendor).

D. Example Applications of the Invention

1. Substitution of Information and Multimedia Content in Document Templates

In this simplest of applications of TIC, a document or other form of media have the form of templates. The templates contain both static content and variable content sections. The variable content sections are tagged with variables or expressions, which are evaluated in the context of a client database to produce a description of the actual content to display in that section. For example, if the client database includes the name of the viewer as the value of a variable viewer.name then a document could be addressed to each specific viewer by specifying a variable section with tag viewer.name.

Figure 4:
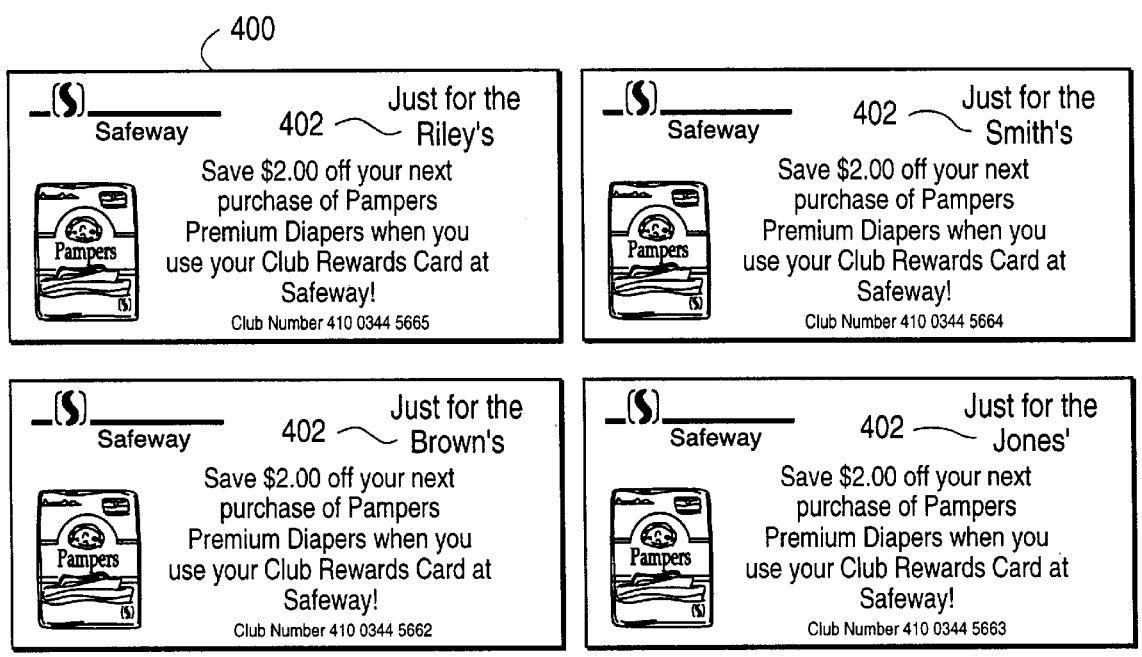
FIG. 4 illustrates four example illuminations of a template document.

FIG. 4 illustrates this application. Here an electronically presented coupon 400 includes a variable section 402 that is encoded with a variable for the consumer's name; each of the four coupons illustrated has been customized in this manner from a same basic template. Upon presentation at the consumer's computer, the consumer's name is retrieved from the client database and inserted into the variable section, resulting in a customized coupon.

Similarly tags could be used to specify the logo or URL or other contact information for a specific merchant or organization as in merchant.logo(merchantID=123456). These tags could be evaluated at any point in the production process including the context of the individual viewer.

2. Customized World Wide Web pages

Another type of structured document are web pages that are sent in the form of HTML annotated documents over an intranet or Internet and viewed using a World Wide Web browser, such as Netscape Corporation's Communicator or Microsoft Corporation's Internet Explorer. The HTML tags determine the form and content of the various elements of the documents. Typically, these tagged elements include references to other documents which are loaded as the tags are evaluated by the browser.

For this application of TIC, special tags are included in the document wherever selectable content is desired. These selectable content tags will include information which is evaluated with respect to the individual consumer's profile to produce a set of options for which content to present together, with criteria for determining a measure of appropriateness of each option depending on the attributes of an individual viewer. Examples of such attributes might include the age and gender of the viewer, her income level, whether she owns her home, dines out often, travels to Asia, has a pet, or whether she is interested in science. Based on its model of the viewer, TIC will evaluate the criteria for each option and choose the option with the highest measure of appropriateness. The consequence is that two different viewers of the same URL to a TIC enabled page could be presented with very different content and have a very different experience.

Figure 5A:
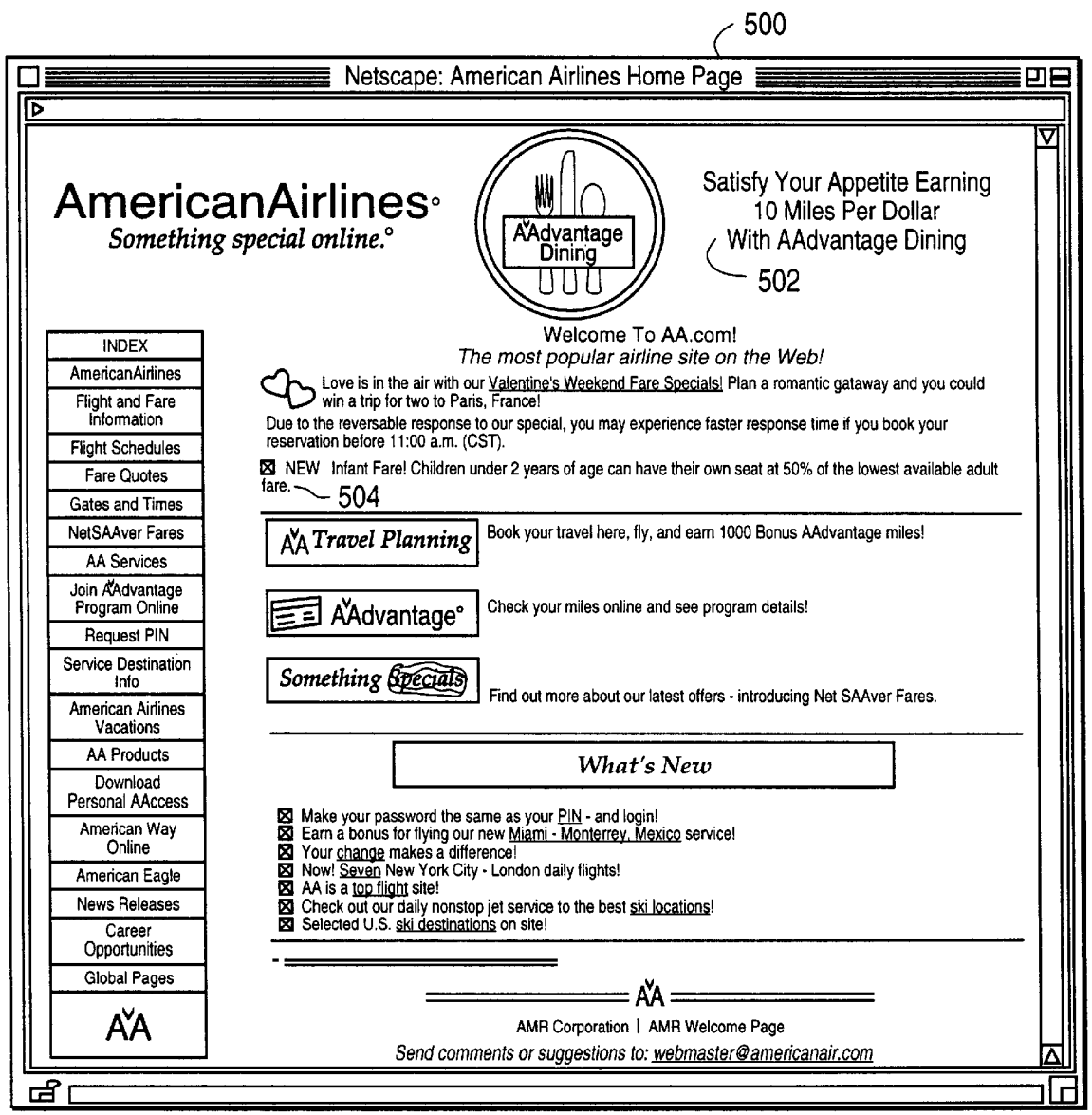
FIGS. 5A and 5B illustrate examples of an illuminated web pages.
Figure 5B:

FIGS. 5A and 5B illustrates two examples of this application. In FIG. 5A there is shown a sample web page 500 that has been illuminated and augmented in view of the consumer profile of a new family. Here, the web page 500 is the home page of a merchant, and has been augmented to include information pertinent to the interests of the consumer/new family. For example, in the top portion of the web page, promotional information 502 for a dining program has been inserted, and in light of the new family's changed consumption patterns (e.g. repeated purchases of diapers indicates the presence of a baby in the family), information 504 promoting infant-related services of the merchant of interest to the new family has been included in the third line of web page.

Referring now to FIG. 5B, this same merchant's home page has been illuminated differently for a different consumer, here an unmarried skier. In this web page 506, the top portion now has a different promotional item 508, promoting a ski vacation. Similarly, since to the transactions of the unmarried skier did not imply the presence of children, the third line of the web page now includes different promotional information 510, this time for a travel auction.

This example shows has a templated web page can be augmented with information that is particularly based on the consumer profile of the consumer viewing the web page. This approach differs from existing "personalized web pages," (e.g. "My Yahoo" at Yahoo.com) since the consumer profile is based on the transactional behavior of the consumer from both online and off-line behavior, instead of a mere list or specification of static preferences and selections by the consumer (e.g. selections by the consumer of which news topics, stock names, etc. to include on the personalized page). In the foregoing examples, the consumer did not preselect which promotional information was of interest to her prior to visiting that merchant's web site. Indeed, no previous contact by the consumer to the web site was even necessary. Instead, the selection of information to illuminate the web page was made dynamically based on the consumer profile, even the very first time the consumer visited the web site. Another difference with existing approaches to "personalized web pages" is that the consumer profile is stored under the control of the consumer's computer. This method provides an extra level of privacy protection.

The range of selectable content for a web page or other structured document is unlimited. This application of TIC can be used for example to implement a personalized web based magazine where articles are chosen and presented according to the viewer's interests and preferences. This application can also be used to allow very accurate targeting and personalization of advertisements and other kinds of commercial offers.

3. Automatic Completion of Fields in Electronic Forms

This application illustrates both the illumination and the interpretation functions of TIC. When presenting a form to a user, TIC can treat it as a template in which the input fields of the form are treated as expressions which evaluate to the corresponding user data.

For example, fields like name, address, social security number, marital status, annual income, are tagged and those whose values are available in the client database are automatically filled in before the form is presented to the user. This part of the application utilizes the illumination component of TIC. When the form is submitted, after filling in unfilled-in fields or changing fields pre-filled by TIC, TIC treats the form as a document to be interpreted. Thus, information in tagged fields whose values were not known to TIC, or for which the values have changed from those in the model, is extracted by TIC and used to update and extend the personal information in the client database.

4. Targeted TV Commercials

This application of TIC is based on the observation that the bandwidth available for TV broadcast via cable or satellite is greater than necessary to support standard broadcast programming. One of the options for the excess bandwidth is to broadcast multiple commercials and other kinds of announcements simultaneously together with selection criteria. A television set-top box equipped with TIC selects the most appropriate of the possible commercials and announcements.

For two-way interactive TV, an alternative is for TIC to target content in a manner similar to that proposed for a world-wide web implementation. That is, instead of sending down multiple commercials simultaneously with selection criteria, only the criteria need be sent down a much smaller data pipe. The set-top box or interactive television can evaluate the selection criteria against the local database and request the appropriate commercial from the head-end.

The next section further describes one embodiment of the present invention.

E. Basic Concepts

1. Products, Consumers, and Viewers

By a "product," there is meant any object or activity which may be used for any purpose and whose use can be observed either directly or indirectly through some form of report, i.e. a structured document electronically delivered. The use of a product is called "consumption." Any individual or group of individuals acting as a consuming unit of products will be referred to as a "consumer." Typically, the set of individuals making up the consumer unit represented in the totality of transaction reports analyzed by TIC will be a superset of the set of individuals actually viewing content at any particular time. The term "viewer" is used to distinguish the entity (which may itself be a collection of individuals) actually viewing the targeted content on a consumer computer from the consumer unit as a whole. For example, a newborn will not participate as a viewer of targeted content, but will be a part of the total consuming unit. So, in general, infant products will be relevant to the consumer unit, which includes a newborn. However, depending on lifestyle, one individual may have more responsibility for the newborn than others may have, and thus knowing which individual is viewing the content is important for targeting content for the newborn. In general, the appeal of a given product or activity will depend both on the needs and interests of the consumer unit as a whole and on the special needs and interests of a particular set of viewers. A query used for targeting content may reference both.

2. Profiles: Facts and Models of Consumers and Products.

TIC distinguishes between "facts" and "models" and allows targeting of content based on either or both. Facts include information obtained by direct observation, extracted from transaction reports, or supplied by generic TIC fact databases. Examples of facts include information about individual transactions, statistical summaries of transactions (totals, averages, etc.), personal information obtained from forms, and generic contact, relationship and classification information about products and merchants. A targeting query based on facts might ask, for example, about purchases of particular products or classes of products from particular merchants or classes of merchants. A "model" means a theoretical or mathematical construct developed from facts and used to make conjectures and predictions about the consumer's current and/or future state and behavior. A consumer profile comprises the consumer model and a database including facts pertinent to the consumer. Within TIC, the function of a model is to predict the degree of appeal a given product has to a given consumer at a some time.

F. Components of a TIC Model

TIC can support a variety of models, even simultaneously, within a common framework. In one embodiment, a TIC model consists of the following components;

1. An Array of Characteristic Values

The basis for a TIC model is a choice of characteristic values which together form a model of a given consumer or product at a given time. The nature of these characteristics and their values is a property of the model. For example, one approach is to characterize an individual in terms of certain behavioral attributes, such as conservatism, social consciousness, status consciousness and so forth. Another approach is to characterize behavior in terms of the degree to which the behavior correlates with certain archetypes such as the mom, the businessman, the professional woman, and so on. Alternatively, the characteristics may have little or no intuitive meaning. They may simply be formal mathematical constructs determined by some statistical analysis of consumer behavior. TIC does not limit the choice of characteristics or their interpretation except to assume that the values of characteristics can be represented as a real number.

The characteristic values for an object will be represented as a vector of real numbers where each value measures the degree to which the corresponding characteristic applies to the consumer or product. For example the value of the conservative attribute may have a value between 0 and 1 where 1 represents complete conservatism and 0 represents complete radicalism. The vector of characteristic values for a consumer represents a model of his interests and the vector of characteristic values for a product represents a model of the appeal of the product.

2. An Appeal Function

In general, the greater the correlation between a consumer profile and a product profile at a given time, the greater will be the expected appeal of the product to the consumer. An "appeal function" is a procedure that computes the appeal of a given product to a given consumer as a function of the consumer and product profiles. For example, an appeal function may be based on a generalized inner product of the consumer and appeal profile, e.g. a weighted sum of the results of multiplying each corresponding pair of characteristic values.

3. An Assignment of Appeal Profiles

Consumer profiles are developed from an analysis of the consumer's past transactions. The contribution a given transaction makes to the consumer profile is assumed to depend on the appeal profile of the product consumed in the transaction, the time of the transaction, and the amount of resources committed by the consumer to the transaction. In order to make use of a transaction for modeling, the product must have a pre-assigned appeal profile. Typically, appeal profiles for merchants or products will be assigned a priori based on known statistics, market research or the intuitive knowledge of experts. In addition, with the explicit permission of randomly selected consumers, consumer profiles can be fed back to the model in order to refine appeal profiles.

4. Consumer Profile Update Process

The maintenance of the consumer profile is an on-going iterative process. Prior to having any knowledge of transactional data about the consumer, the consumer is assigned an initial profile based on known demographic information. The consumer profile update process analyzes each newly interpreted transaction, in particular, product or merchant profile, time of transaction and transaction amount to produce a refined profile. Typically, this process will depend on more than the current profile and the new transaction. It will probably also require the maintenance of aggregates and other summary data about the profile and transaction histories over various time intervals. As an example, it may require maintaining totals of resource consumption for each characteristic over various intervals, remembering specific transactions, such as purchases exceeding some threshold amount, and changes in profile over various intervals.

G. Overview of TIC Components

The TIC system is divided into clients and servers. A client system is one used by a viewer. A TIC server system is one external to client systems and which provides TIC software and generic information used by the client system for interpretation and selection. Except for providing information requested by the client, all the important TIC processing (i.e. interpretation and selection) takes place on the client system. In addition to TIC servers, the TIC environment includes third party servers which provide report data for interpretation, illuminated content, and/or content requiring illumination. Either TIC or third-parties may also provide physical disk storage for encrypted data which is logically under the control of the client system.

1. Client Side Components

The client side of TIC consists of a database which represents the TIC model of the consumer together with methods which populate the database (from document interpretation) and use the model for targeting and personalization of content.

a) Consumer Information

All personal information regarding a consumer is represented and stored as objects in the TIC database under the control of the consumer's viewing device. Selection criteria are implemented as queries against this database and may reference facts ("Are there any known transactions with Macys?"), models ("Is it likely that someone in the family is pregnant?"), or both.

The database of information about consumers maintained by TIC includes the following components.

b) Facts Database:

The facts database includes personal information (e.g. name, address, social security number) about consumers, transactions histories (e.g. credit card purchases from Macys) and summaries (e.g. totals, averages) of transaction data together with facts about elements in the domains of the transactions (e.g. URL and phone number for a given merchant, the fact that two merchants are competitors, product to product category mappings, the fact that two products are complementary).

c) Model(s) Data

This is data relating to the current state of each active TIC model. This includes the current characteristic values, summary data, deltas (i.e. changes), and whatever additional values are required by the model to continue the update process and for model-based selection of content.

d) Metadata

Metadata describes data types, data sources, summary entries, relevance of facts to conjectures, current conjectures, integrity constraints, update frequencies, report formats and the mapping from report data to database schemas. The metadata also includes the history of the viewer's interaction with TIC and policies used by the content selection engine. The system is reflective in the sense that metadata can be queried and reasoned about in the same context as "ordinary" data.

e) Calendar

The Calendar is used by the scheduler to manage model updates and maintenance. All components of the consumer database and models are dynamic. New reports result in additional database entries and over time facts may be forgotten (aged out of the database) leaving only their contributions to summary data. Conjectures change as confirming or refuting evidence is accumulated. New and changed inference rules and metadata are downloaded to the client periodically.

f) Report Interpreter

The report interpreter parses online documents and interprets the entries as new facts. The report format and the mapping from report data to the schemas in the facts database may be self-documenting (i.e. specified within the report itself) or registered by source in a server database and downloaded and stored as metadata. As new facts are entered, triggers associated with consistency constraints are activated to download additional data (e.g. the entering of a transaction referencing an unknown merchant cause information about the merchant to be downloaded from server databases.) Similarly when facts key to a conjecture are downloaded, the Modeling Engine is invoked to update confidence measures and initiate new conjectures.

g) Modeling Engine

The Modeling Engine updates consumer models in response to new facts or when queried by the selection engine.

h) Selection Engine

The selection engine chooses what content to present to the viewer when presented with a selectable content option. The choice is controlled by appropriateness, as specified by policies of the media owner and content provider, relevance which is evaluated from models of the viewer based on relevance criteria specified by the content provider, specific constraints for a specific slot specified by the media owner, and overall business policies specified by the media owner and TIC operator. The relevance criterion is represented as a logical expression which is evaluated relative to the viewer model to produce a confidence measure via the same inferencing used to evaluate other conjectures. In representation and use, the criterion in effect defines the conjecture: "this content is relevant to the current viewer at the current time."

i) Scheduler

In the preferred configuration, TIC executes as a background service on the client computer. The scheduler is responsible for scheduling system maintenance including downloading reports to which the user has subscribed and regular updates of facts, rules, and policies.

2. TIC Server Side Components a) Server Side Knowledge Bases

The primary purpose of the server side is to serve as a repository for information required by the client systems. These include:

Report metadata: Information required to parse and interpret documents.

Domain specific fact databases: Information relating to report elements. In interpreting credit card reports, for example, these include merchant and product IDs, contact and classification information for merchants, products, and manufacturers, and relationships between merchants, products and manufacturers.

URL and Software classification databases: These are particularly important for analyzing viewer behavior based on active web pages, windows, and processes.

Rules and policies: The rules and policies used by the Modeling and Selection Engines for updating the user model and measuring and selecting content.

Content Description Databases: Elements of these databases contain references to actual content together with relevance criteria and the metadata required to evaluate appropriateness and consistency with business policies.

Statistical, Accounting, and Administrative databases: These databases track the number of views and other statistics needed for billing and determining overall effectiveness of TIC content selection.

H. Information Used for Selection

1. Aging/Evolution of Profiles and Data; Trend Prediction

A consumer's profile changes over time. Generally these changes are evolutionary and, in some cases, even predictable. Attributes will, in general, change at differing rates and the rate of change will, in general, itself depend on the current profile. Thus, for example, profiles for young people will change more rapidly than profiles of older people. Some changes are predictable. A pregnancy either terminates or results in a newborn; the newborn eventually becomes an infant; the infant becomes a toddler; and so on. In some cases, patterns of change are predictable but the precise timing is not (e.g., at some point almost every adolescent becomes extremely concerned about his or her appearance though the individual age at which this occurs may vary). In these cases, certain specific indicators, e.g. purchase of acne medicine, may be used to discover that a transition has occurred. In general, specific kinds of changes can be recognized by changes in consumer profile, for example a purchase from a maternity store. One way of capturing time dependence which is used by TIC is to compute and maintain profiles over varying periods and track the deltas for these profiles, i.e. the changes in the profiles. Selection criteria and computed attributes can thus be based on behavior over specified periods or on changes in behavior.

2. Selection Data

The information used by TIC for selection has four basic components:

1. Personal information and online behavior;
2. Transaction histories and summaries;
3. Conjectures about the psychographic and demographic attributes of the consumer and predictions of important events which will cause discontinuities and possibly fundamental changes in the consumer profile. A birth, a marriage, a divorce, the purchase of a house, and similar transitions are important in that they result in fundamental changes to the profile and very different behavior during the transition period.
4. Conjectures about the psychographic and demographic attributes of the current viewer.

The first two components contain purely empirical data which is obtained either by direct observation of online actions or by interpretation of reliable reports. The third component is theoretical; it represents a guess about the consumer's characteristic behavior and lifestyle and potential changes based on information in the first two components. The fourth is also conjectural based primarily on online behavior and is used to distinguish the individual viewer from the consumer unit as a whole.

3. Personal Information and Online Behavior

Personal information, such as name and social security number, is extracted and accumulated from online forms filled out by the user or from the interpretation of online statements. The primary use of this personal data is in pre-filling online forms and as a source of demographic information, e.g. age, marital state, number and ages of children.

Online behavior includes information like what software applications reside on the user's machine, what applications are currently active, favorite websites, recency and frequency of visits, and TIC interactions including what content was shown when and what content elicited an online response from the user. Sources of online behavior include interpretation of log and history files maintained by browsers and direct recording of behavior within TIC enabled documents.

4. Transaction Histories and Summaries

Transaction histories are obtained by interpreting online reports. A "report instance" means a document from a specific vendor describing a specific set of transactions, for example, a credit card report for a specific account specifying transactions that occurred over a specific period of time. A "report" means the format of report instances from a given vendor, e.g. a credit card report from Citibank. All report instances of a given report preferably have a common format, i.e. can be parsed by the same parser. (e.g. If a credit card company has multiple credit card report formats depending on the class of credit card then each is considered a distinct report.) A "report type" means a class of reports having a common interpretation, e.g. a credit card report.

With each report type, TIC associates a database schema and summary data. Summary data includes statistics on recency, frequency, and total amounts aggregated over individual products and vendors and over classes of products and vendors. All report instances for a given report type are interpreted into a common schema and summarized. Thus, all credit card reports will be interpreted into the same database schema regardless of source. The schema for a credit card for example would include fields for account, date of sale, amount, merchant identifier, reference number and location.

5. Consumer and Viewer Profiles

The consumer and viewer models are represented as weight vectors over component attributes while the consumer profile depends on all observations and transaction reports. The viewer profile, for the current viewer, is computed only from observations and reports which are known to apply to the current viewer. The extent of viewer specific profile information available depends on the client environment. At a minimum, it includes actions within the current session of TIC. If a URL history report is available, it is interpreted by TIC because it is useful for differentiating between the specific interests of the current viewer and that viewer's interests as a member of the consumer unit.

I. How Content is Targeted and Selected

1. Selection Criteria

Each element of a content description database contains a content specifier and a selection rule. The purpose of the selection rule is to determine whether the content specified will be of interest to a given consumer. A selection rule is represented as a query expression which is evaluated against the TIC consumer database. There are two basic kinds of selection criteria which may be combined using logical connectives (not, and, or) to form a given selection rule.

2. Model Based Tests

An appeal vector together with a threshold parameter defines a model based test. Model based tests may be specified for the consumer unit as a whole or against the individual viewer. The appeal vector is tested against the specified user model. The threshold parameter is used to vary the sensitivity of the test.

3. Direct Database Queries

These are arbitrary database queries against the transaction histories and summaries. For example, "is this consumer already a customer of mine?", "is the consumer a customer of competitor X", "has the customer spent at least a thousand dollars on consumer electronics products over the past year".

4. Selection Policies

Selection criteria are associated with and used to determine the suitability of a specific piece of content to a given consumer or viewer. Selection Policies, on the other hand, are associated with potential locations for content. Policies are typically defined by the owners of these locations and are used to restrict the set of candidates considered for that location and to choose which candidate to use in case multiple candidates are suitable. For example, content appearing on an entry for "Circuit City" on a Bank of America credit card statement may be subject to policies defined by Bank of America which owns the page, Circuit City which owns the entry, and general policies of the TIC operator. Selection policies are essentially analogous to selection criteria in the sense that where selection criteria test suitability of a consumer, a selection policy tests suitability of content.

J. An Architecture for an Implementation of TIC on the World Wide Web

1. Overview

As noted earlier TIC is particularly well suited as an application for the World Wide Web. The viewer views content via an Internet browser such as the Communicator from Netscape or the Internet Explorer from Microsoft. In this context, report data is accessed via HTTP and represented as XML annotated text. In reports, the XML tags are used to specify the report type, report source, and report format.

Web Pages with TIC selectable content options are represented as XML annotated HTML text. Special XML tags mark selectable content with selection constraints and display criteria. TIC mediates the display of these pages. TIC can be conFig.d as a plugin, like Shockwave, or as a Java applet. TIC enabled web pages are pre-processed by TIC before being passed to the browser for presentation. XML tags specifying the format and interpretation of interpretable report data are evaluated by TIC and the report data is interpreted. Selectable content tagged data is evaluated to produce an HTML reference via a TIC URL to actual content and that reference is substituted for the selectable content specification. TIC specific tags are stripped and the resulting page passed to the browser for display. The TIC URL substituted for selectable content is reported to the TIC accounting server.

2. Client Side Components

Figure 6:
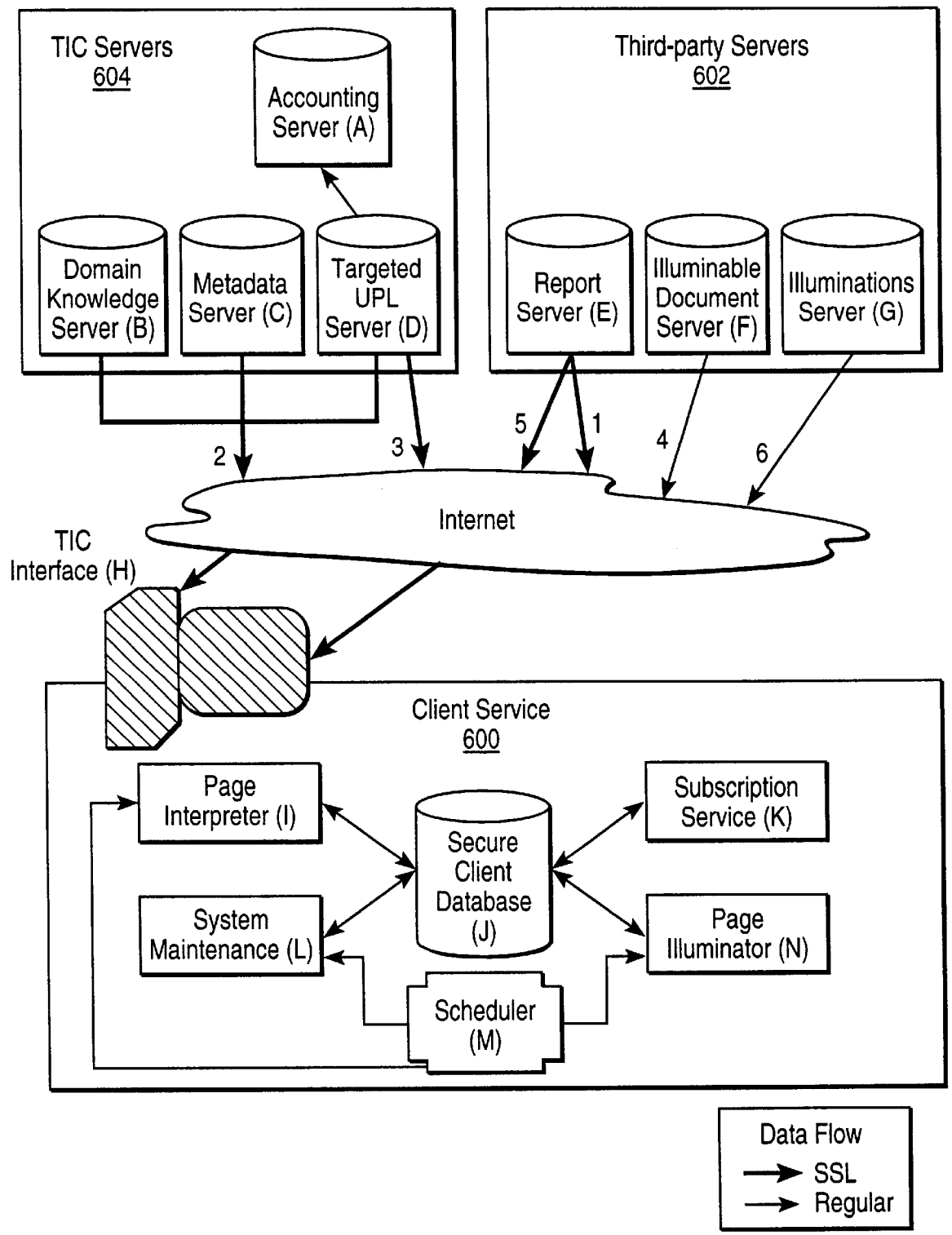
FIG. 6 is an illustration of the client and server side architecture for a World Wide Web implementation.

Referring to FIG. 6, there is shown one preferred embodiment of the client side 600 components of TIC assuming Windows NT as the client operating system and Netscape 4.0 as the client browser X, and the server side components. In this embodiment, TIC is written in Java. A similar implementation can be constructed for other client operating systems and network browsers.

a) Secure Client Database

The heart of the client side 600 of TIC is a secure database J. All consumer-specific persistent data of any kind including transaction data, metadata, model data, calendar data, policies, administrative information, the location of TIC servers 604, reside in and are only accessible through the database interface. Access to the database is through Java. Only TIC software has access to the database access routines and the on-disk forms of the data are encrypted with a private key under the control of the client (i.e. consumer computer). FIG. 6 illustrates the client database J as locally resident on the client/consumer computer, which is one preferred embodiment. However, in other embodiment, the client database be physically resident on other devices, and only logically controlled by the consumer computer, so that access to the database still remains fully under the control of the consumer.

In addition to maintaining client-specific data, the client database J behaves as a cache to the TIC server databases 604. Thus all queries, even for generic information such as data about merchants or products, are evaluated first in the client database J. If no information is available locally and there is no flag indicating that global information is unavailable, a remote query for the data is evaluated at a TIC server 604. If no information is returned, a flag indicating that information is unavailable is stored along with a timestamp. If the requested data is available, it is returned to the client and stored in the client database J.

d) System Maintenance Service

In the preferred implementation, the downloading and interpretation of transaction reports and communication with TIC servers for software maintenance and other generic data requests are handled by a system maintenance service L running as a background process. Activities of this service L are driven by events scheduled on the TIC calendar, which is a list of <activity, time> pairs in the client database J, which are used by the scheduler M to initiate the activities at the proper time. Version information and the protocols and information necessary to access consumer transaction reports, along with the event calendar are stored in the client database J. Before carrying out a scheduled activity, the service L queries the client database J to determine whether the system libraries have been updated. If so, the relevant libraries are reloaded, a) Scheduler The scheduler M is the software service responsible for triggering maintenance service and report interpretation for subscription reports.

b) Subscription Service

Requests for regular maintenance updates and report downloading are handled through the subscription service K which in turn updates the system events calendar.

TIC Interface and HTML/XML Parser: Access to TIC from the browser X is through an interface H provided by JavaScript and Java Applets. Since TIC requires access to local persistent storage and network access to communicate with TIC databases J, the Java applets run in trusted mode. All sites making use of TIC are certificated.

As described in the overview section, fields for interpretation and illumination are tagged using XML (Extended Markup Language) which is parsed by an XML parser. The first step in the interpretation or illumination of a web document is to parse it into list structures. This is the role of the parser. After this is done, all manipulation of the page is carried out on the list structures.

e) Report Interpreter

The report interpreter I operates on parsed reports. It first pulls out the XML tagged components that identify the report. The interpreter I then queries the client database J for the type and format of the report. The format is represented as an object which includes a method for parsing the list structured form of the report into a stream of logical records. The report type includes a method which interprets each logical record. This method is applied to the stream of records.

f) Page Illuminator

The page illuminator N operates on a parsed page. It generates a list of the illumination forms, i.e. the forms with XML tags specifying TIC illumination. It then passes that list to the selection engine, which is inside Page Illuminator N, to choose the actual content (possibly the empty content) to substitute for each illumination form. The resulting structure is then converted back to text by an HTML Printer and streamed, using JavaScript, to a browser window for display.

4. Server Side Data Servers

The server side components of TIC are essentially passive data providers and are managed by the TIC operator or third-parties.

a) TIC Data Servers

The primary purpose of the TIC data servers 604 are to serve as a repository of software and domain specific data related to the subject matter of reports, such as product descriptions and vendor contact information. These are represented as standard relational databases with standard web-based interfaces used to populate, query, and modify them. Specifically, there are four types of servers managed by the TIC operator.

1) Accounting Server

The function of the accounting server A is to track the use of illuminations for billing purposes. The accounting server A is updated as conditional illuminations are selected by the targeted URL server D for presentation to the client 600 and again when the chosen illumination is selected by the client 600.

2) Domain Knowledge Server

The domain knowledge server B contains domain specific data related to report elements. In a credit card context, for example, this data provides information about merchants including address, phone numbers, URLs.

3) Metadata Server

The metadata server C provides software, policies, report format, and other forms of non-domain specific data required by TIC to interpret and illuminate documents.

4) Targeted URL Server

The targeted URL server D presents selectable content options to the page illuminator N. These options consist of queries with associated content tokens. The queries are evaluated against the client database J to determine the most appropriate content tokens. When the page illuminator N has selected among the options, the content tokens are converted to URLs and the accounting server A is updated.

5. Third Party Servers

A third party server 602 can be any website which provides documents or data used by TIC for interpretation and illumination. Conceptually, there are three kinds of servers. However, a given website may act as one or all of these types. In fact, a given document may be both interpretable (i.e. have a report format which is parsed into data fields for updating the secure client database) and illuminable (i.e. have embedded TIC-tags which are replaced during the illumination process).

1) Report Server

A report server E is a source of the interpretable reports used by TIC to populate the secure client database J used in the illumination process.

2) Illuminable Document Server

An illuminable document server F provides illuminable documents, which are web content enabled for TIC illumination. These documents include a Java preamble which invokes the TIC client side processing and TIC tags for illuminable elements.

3) Illuminations Server

Since illuminations are implemented as URLs, any website can be a server G for illuminations for illuminated pages. The page illuminator N simply substitutes the appropriate HTML text. The Internet browser X then embeds the content automatically in the displayed document.

K. Exemplary Interpretation and Illumination Processes

Referring again to FIG. 6, there is shown various illumination and illumination processes using the above described architecture. In these processes, data flow occurs over either the Secure Sockets Layer or standard HTTP.

Data/Process Flow Action

1. Scenario 1: Client Views TIC Enabled Report

1 The report server E sends a TIC tagged report in response to a client request.

2 The TIC client service 600 interprets the report and sends a request to TIC servers 604 for domain knowledge, metadata and a list of content selection queries. TIC client service 600 also updates TIC secure client database J with relevant information.

3 TIC client service 600 evaluates the list of queries against the consumer model in the client database J to select the most relevant selection and requests the targeted URL server D to send the URL associated with the selection. The targeted URL server D also logs the selection with the accounting server A for accounting and billing purposes.

6 TIC client service 600 gives control back to browser X which displays the page by resolving the URLs placed by the TIC client service 600. The content for these URLs are resolved from illumination servers G.

2. Scenario 2: Client Views TIC Enabled Home Page
   4 An illuminable document server F sends a TIC tagged home page in response to a client request.
   2 TIC client service 600 interprets the page and requests TIC servers 604 for metadata and a list of content selection queries.
   3 TIC client service 600 evaluates the list of queries against the consumer model to select the most relevant selection and requests the targeted URL server D to send the URL associated with the selection. The targeted URL server D also logs the selection with the accounting server A for accounting and billing purposes.
   6 TIC client service 600 gives control back to browser X which displays the page by resolving the URLs placed by the TIC client service 600. The content for these URLs are resolved from illumination servers G.
3. Scenario 3: Client Views TIC Enabled Forms
   4 An illuminable document server F sends a TIC tagged form requesting fields to be pre-filled from the secure client database J. Upon client 600 sending form back to server F, TIC client services 600 interprets the form and updates the secure client database J with field additions and changes.
4. Scenario 4: TIC Secure Client Service Requests Scheduled Report
   5 Report server E sends a TIC tagged report in response to a scheduled request from the scheduler M of the client 600.
   2 TIC client service 600 interprets the report and requests TIC servers 604 for domain knowledge and metadata. TIC client service 600 updates TIC secure client database J with relevant information.

L. Client-side Procedures

Figure 7:
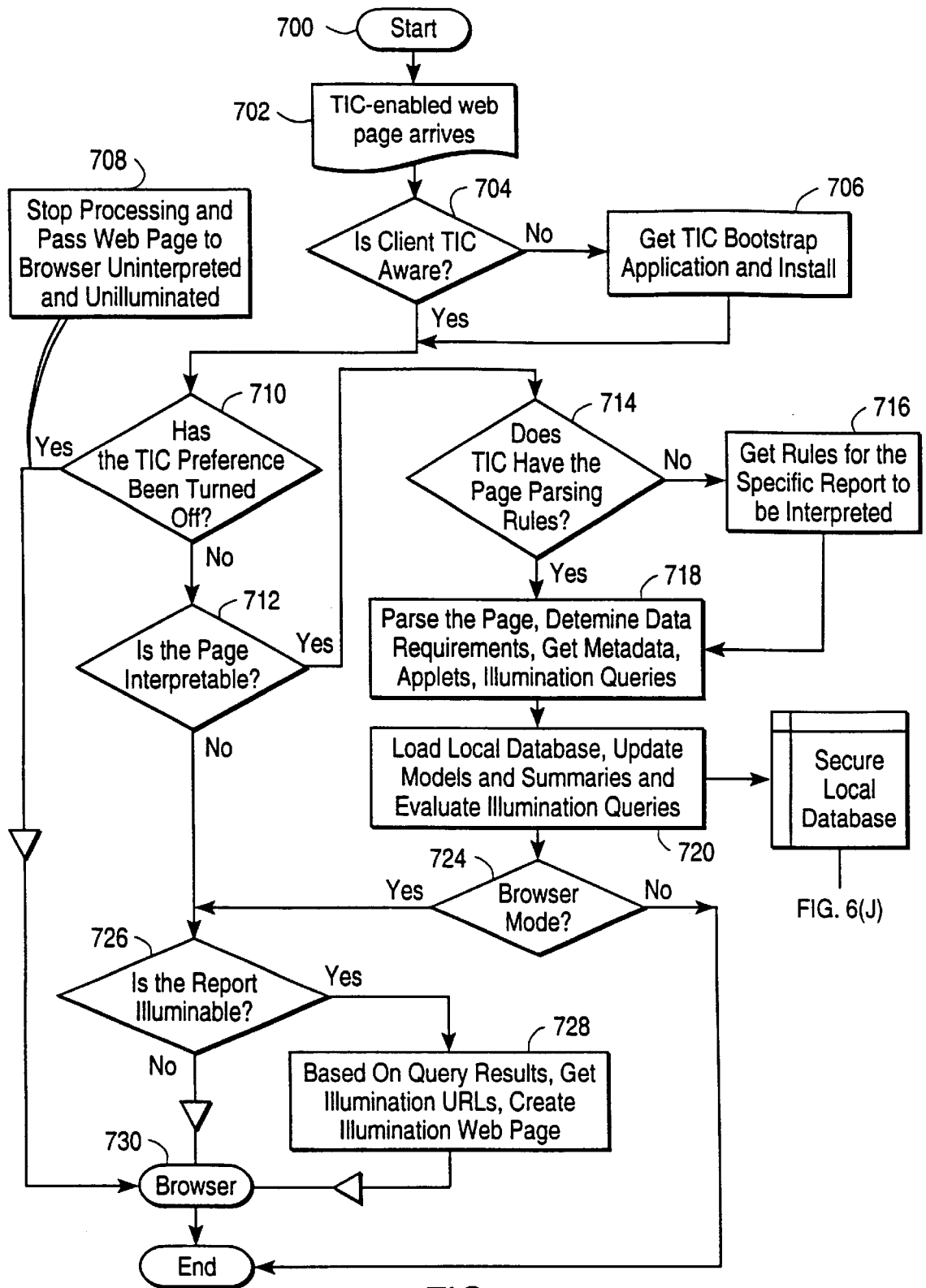
FIG. 7 is a flowchart of the client-side procedures for interpreting and illuminating web-based structured documents.

Within the browser, TIC is activated by JavaScript preambles in pages loaded from TIC enabled web sites. FIG. 7 illustrates the client side processes that occur when illuminating and interpreting TIC enabled documents.

1. Installation

A TIC enabled web page initially arrives 702 at a client computer. Browser pages from TIC enabled sites contain a JavaScript preamble which tests 704 the client environment to determine whether TIC components have been installed on the client and is up to date. If TIC has not been installed, the client is offered the option of downloading and installing TIC. The installation procedure 706 installs Java libraries, initializes the TIC database, and creates, enables, and starts the TIC background service process. If TIC is installed but not up to date, new libraries are installed, an update applet run, and the version information in the database updated.

Models are represented as subclasses of the abstract class Model. In addition to having the attributes and methods described earlier, objects of class Model have an installation method which creates the database schema for the model including storage for characteristic values and summary data with associated triggers. The installation method also registers the Model in the database so that it can be used. Installation of a model involves downloading the class definition for the model and running the install method for the model.

2. Invoking TIC from the Browser to Process a Page

After any necessary TIC installation has been completed, the JavaScript preamble in a TIC enabled page determines 710 whether TIC processing has been disabled on the client. (Disabling of TIC would typically be done at the request of the viewer.) If so, then the page is passed 708 through to the browser without any TIC processing. Otherwise, the page is passed to a top-level routine which parses the page and determines 712 whether there is any interpretable or illuminable content. If there is interpretable content, it determines 714 whether the report has already been interpreted. If not, then depending on policy 716 it may schedule it to be interpreted later by the interpreter process or have it interpreted 718 immediately. If it has illuminable content 726, the illuminator is invoked 728; otherwise the page is just passed 730 through to the browser for display.

For regular reports with interpretable data, at the discretion of the vendor, a JavaScript may be run which offers the viewer the option of subscribing to the report, i.e., arranging to have the TIC service process automatically download and interpret the report at specified intervals and times.

3. Interpreting a Report Record

The task of interpreting a report record is handled by a method of the report type. Every report type has an associated schema which includes a table or tables for the transaction history with triggers for updating summary data and preserving referential integrity. The interpretation method first inserts the record data into the table or tables which automatically causes summary data to be updated and additional data to be downloaded as necessary to preserve references. It then cycles through the list of registered models applying the update methods to the transaction.

4. Selecting Content

The role of the selection engine is to determine which illuminable elements on a page to illuminate and for those choices what content to use in the illumination. In general, policies will constrain the number and types of illuminations on a page. These policies are defined by parameters which constrain the density and total number of illuminations and by rules in the form of queries to be executed against content databases (see below) which constrain the candidate sets for a given page and a given illuminable element within the page. Policies may be associated with the type of the page, the owner of the page, and the owner of a given illuminable element within the page. In addition, a specific page may contain explicit policy constraints expressed using XML. In addition to constraints, policies may also specify strategies and heuristics to use in finding and choosing a satisfying set of illuminations and choosing a particular illumination for a given element. For given a illuminable element, factors influencing the choice might include the appeal of the content based on one or several active consumer models, frequency constraints or requirements for a given choice of content, vendor preferences of TIC, the owner of the page, and the owner of a given element. Like constraints on content, the policies regarding choice strategies can be specified implicitly by type and owner and expressed explicitly within the page using XML.

M. Hierarchical Models

Figure 8:
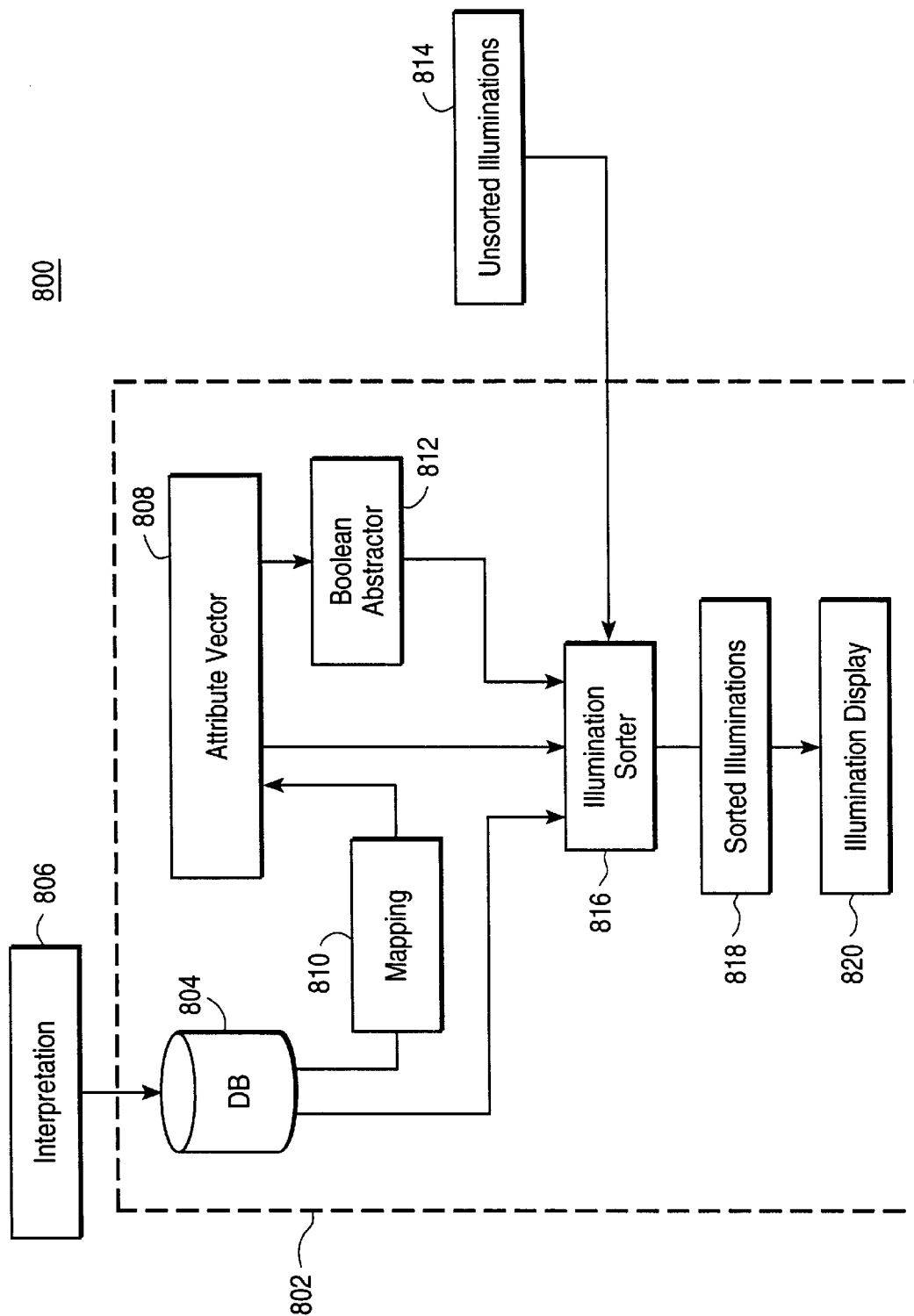
FIG. 8 is an illustration of a system for using hierarchical consumer models for illuminating documents.

Referring now to FIG. 8, there is shown one embodiment of a system in accordance with the present invention. The system 800 includes:

A computing device 802 with local memory, computing capability, persistent storage, a display, and a network connection (e.g. a personal computer with a modem connected to an Internet Service Provider or an intelligent television set-top box connected to a cable head-end). The computing device 802 has access to a database 804 (logically part of the computing device, but it could be resident outside of the device, such as on a remote server computer maintained at a web site), which contains facts extracted from the process of interpretation 806 of a structured document. These facts are used to build an attribute vector 808 through the use of a mapping subsystem 810. Each new fact entered into the database 804 is presented to the mapping subsystem 810, which uses knowledge obtained from a metadata server (FIG. 7) to update numeric fields of the attribute vector. The metadata is cached in the local database 804 and so is available to mapping subsystem 810.

Elements of the attribute vector 810 express such consumer attributes, interests, preferences, or demographics. The data elements are preferably scaled values, though actual values, Boolean, or qualitative values may be used. For example, scaled values may be used for attributes are both numerical, such as relative income (e.g. on a scale of 0 to 1, where 0 is very poor and 1 is very rich), or qualitative, such as "interest in tennis" (e.g. 0 is none, 1 is very tennis-centric). The selection of which attributes to encode in the attribute vector is within the discretion of the system designer and may reflect any useful categorization or attributes of consumer interests, preferences, demographics, or the like.

The elements of the attribute vector 810 can be accessed directly, or can be aggregated and abstracted in a variety of ways, which will be described in detail shortly. A useful abstraction is the Boolean Abstractor 812, which examines elements of the attribute vector 810 and creates logical expressions from them. For example, if the attribute vector for consumer C contains an element $x_i$ which represents degree of confidence that consumer C is pregnant, then the Boolean Abstractor may contain a rule that maps the query pregnant?(C) (which returns TRUE or FALSE) to the threshold inequality: $x_i > 0.75$, which can be checked in the model's attribute vector 808 for a specific consumer.

The goal of creating the attribute vector is to allow illumination candidates to be evaluated and ranked according to their relevance to the consumer. An illumination consists of content, plus a query that may be Boolean or may be a function of elements of the attribute vector. A set of unsorted illuminations 814 is presented to the system 802, and forms a group of selectable content alternatives that may be used to illuminate portions of the document. The unsorted illuminations 814 are received in association with a structured document or portions thereof, electronically delivered to the consumer's computer 802. The unsorted illuminations 814 may be received from one or more content providers, even for a single document. For example, if the structured document is a credit card statement, the merchant identified in each statement line may be responsible for transmitting a number of illuminations to be applied only to its one line. Each content provider will generally have only a limited display area in which to present the illuminations when the document is displayed on a display device.

The Illumination Sorter 816 then uses data from three data sources (the database 804 directly, the attribute vector 808, and the Boolean Abstractor 812) to do two things. First, it selects a set of illuminations that match either facts about the consumer in the database 804 or the consumer's attribute vector 808 well enough. Second, the Illumination Sorter 816 sorts the selected illuminations in an order determined via a match score computed from the three data sources. The sorted illuminations 818 are then presented to an Illumination Display subsystem 820 for presentation to the consumer.

N. The Attribute Vector

The present invention includes a novel method for storing and using information about individual consumers as derived from the transactional behavior of the consumer. The act of interpretation results in a number of facts stored in a database. These facts can be very specific, for example, that a consumer spent $136.78 at Hertz Car Rental in Sacramento on Jan. 4, 1999. In some cases, an advertiser (such as a competing car company) might want to target individuals who rented from Hertz. Such a query is easy to do in a standard database, for example, one that uses SQL commands.

However, in other cases, an advertiser may wish to target individuals who rent cars relatively frequently. In this case, it would be beneficial to have an element of a model's attribute vector represent a propensity to rent cars. Such an element should have the ability to aggregate car rental data across a number of different transactions. It should also be possible to allow the strength of the attribute to "decay" over time, so that if a consumer does not rent a car for some period of time, this attribute becomes less pronounced.

1. Hierarchical Models Using Attribute Vectors

Figure 9:
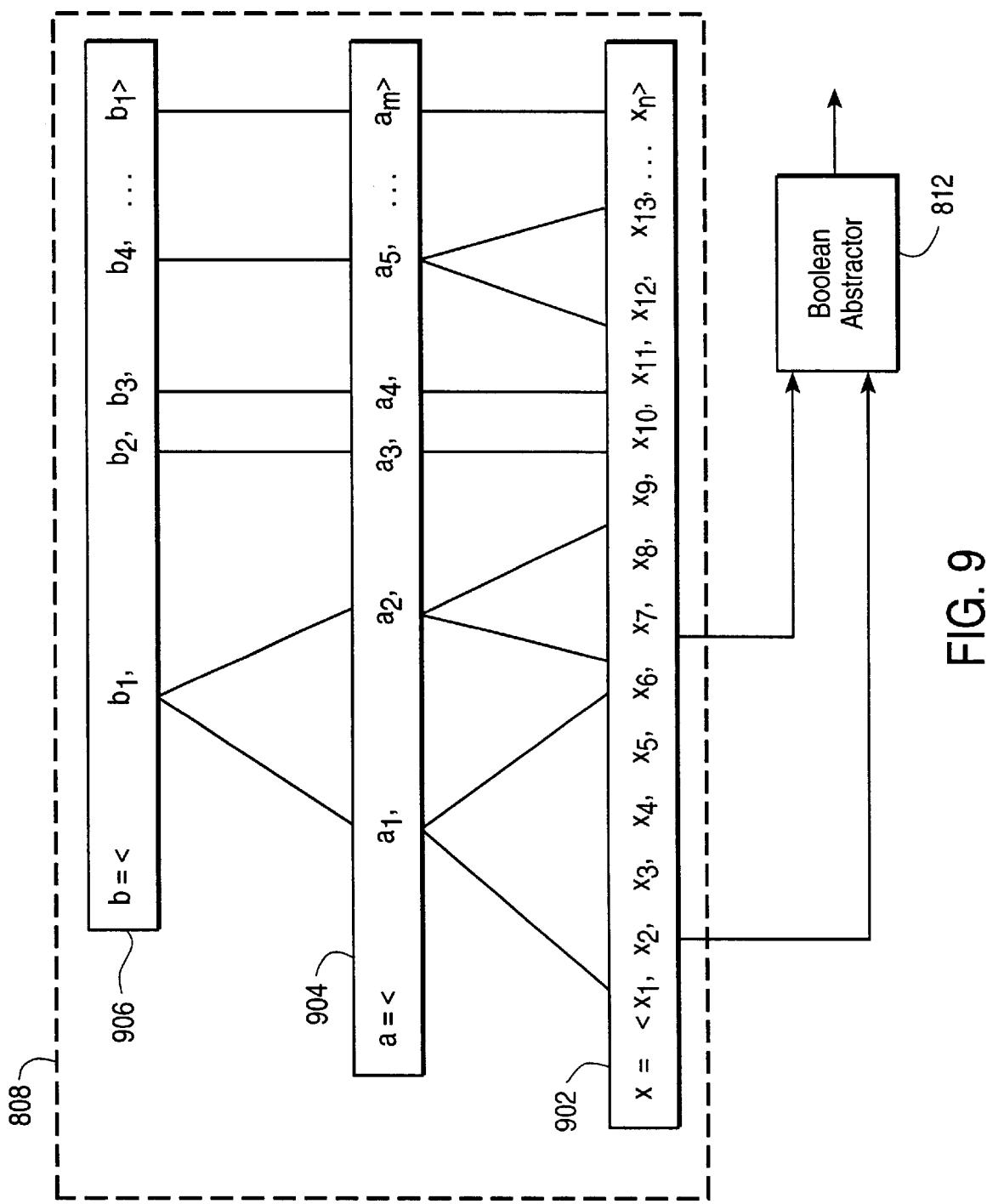
FIG. 9 is an illustration of a hierarchical attribute vector.

FIG. 9 depicts an attribute vector 808, comprising a set of hierarchical vectors 902, 904, and 906. A base level vector 902 shows the vector quantity x comprising a number of base level attributes, having scalar values $x_1, x_2, x_3$, up to $x_n$. Each scalar value can represent a different consumer attribute. For example, $x_1$ may denote an interest in football, $x_2$ an interest in baseball, $x_3$ an interest in volleyball, etc. Obviously, depending on the level of granularity in the description, there may be a large number of scalars. These may be grouped into abstract collections, each represented by an aggregated attribute value. For example, consider hierarchical vector 904, a vector quantity a comprising scalars $a_1, a_2, a_3, \ldots a_m$. Each aggregated attribute in this vector 904 is associated with a selected plurality of base level attributes. Here, the scalar $a_1$ is an aggregated attribute that may represent an interest in sports. This value is an abstraction of data in vector 902. In one embodiment, $a_1$ is an appropriately weighted and normalized sum of the elements $x_1$ through $x_6$ of vector 902; similarly, $a_2$ is a weighted and normalized sum of $x_7$ through $x_9$, and represents an abstraction of the attributes that these scalars $x_7 \ldots x_9$ represent. Element $a_3$ is the same as element $x_{10}$ of vector 902.

This abstraction process may be repeated as needed at further levels of abstraction, wherein one hierarchical vector is used as the base level vector for another hierarchical vector. For example vector 906 has an aggregated attribute $b_1$ which is associated with a selected set of vector 904's aggregate attributes $a_1$ and $a_2$, and has value which derived from the values of the aggregate attributes. In this way, hierarchical representations of consumer interests may be built. A general "sports interest" aggregated attribute in one vector may be derived from lower level attributes for football, baseball, basketball, tennis, volleyball, etc. A general "culinary interest" may likewise derived from "cooking" and "restaurant going" attributes, the latter being further derived from specific restaurant type attribute, such as Chinese, Thai, Italian, etc.

Boolean abstractions of the data are also possible. For example, one example of a function in the Boolean Abstractor 812 computes the threshold function $[(x_2 > 0.4) \& (x_7 > 0.7)]$ where $x_2$ and $x_7$ are taken from the appropriate vector and elements (basic or aggregated) of an attribute vector 808. If $x_2$ indicates an interest in football and $x_7$ an interest in San Francisco, then the threshold function might represent the Boolean query "49'ers-fan?(C)" for consumer C, thereby allowing a content provider to craft a Boolean query for San Francisco 49'er-related targeting of their conditional content. Similarly, threshold tests can be created for frequent-car-renter? and pregnant?, and so forth. These functions are merely exemplary; the present invention allows any type of Boolean function on the elements of an attribute vector to be implemented and passed dynamically to the Boolean Abstractor 812 for execution.

2. Illumination Selection Process

Figure 10:
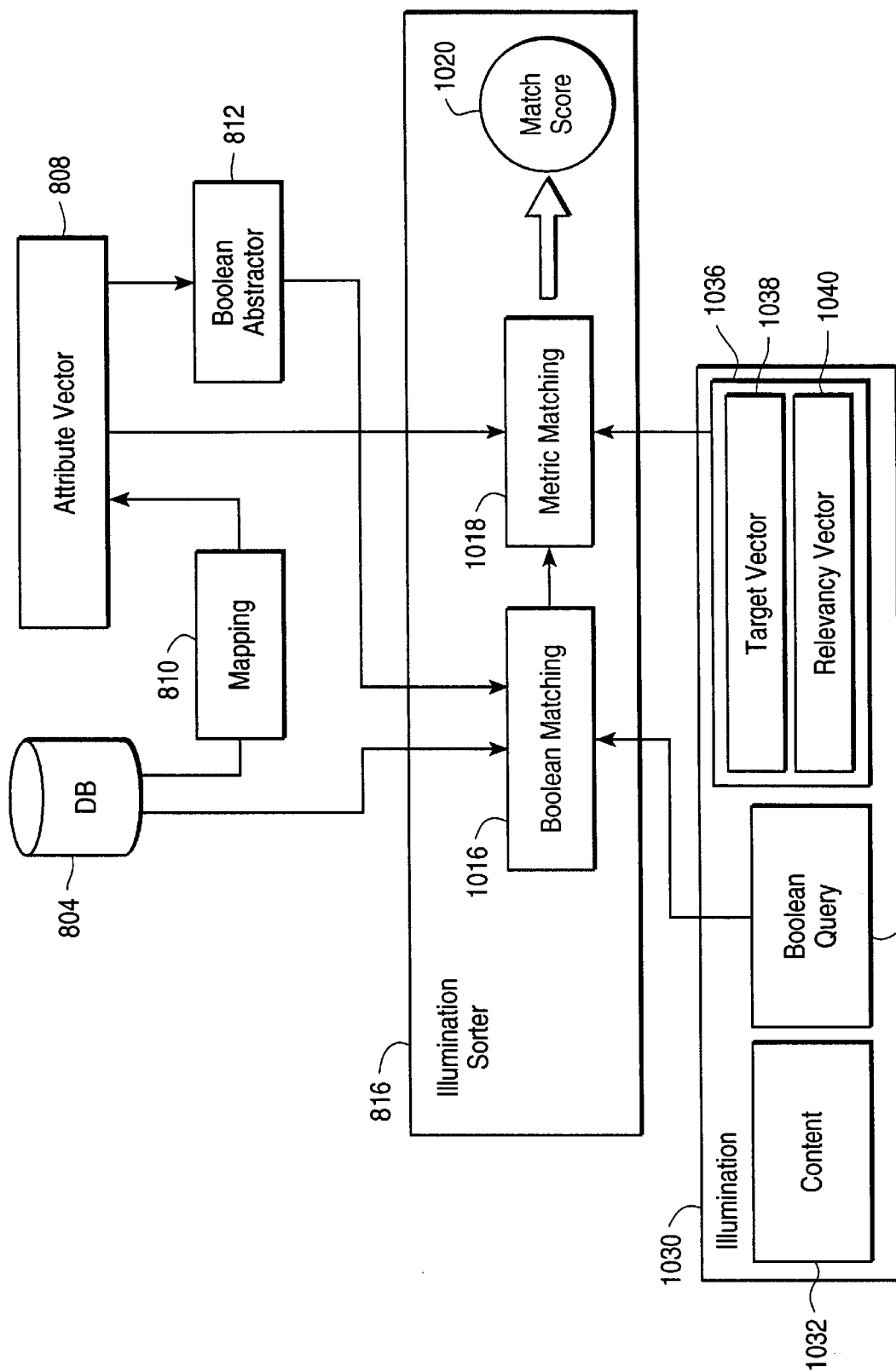
FIG. 10 is a flow diagram of the illumination sorting process.

FIG. 10 depicts the process flow for matching an illumination against an attribute vector and data in the database 804. As previously mentioned, the database 804 contains facts derived from the consumer's transactions, plus relevant metadata cached after retrieval from the metadata server. The mapping subsystem 810 has updated the fields of the attribute vector 808, and the Boolean Abstractor 812 provides additional Boolean functions that may be used in matching vectors associated with received conditional content against the consumer's attribute vector 808.

The Illumination Sorter 816 selects and sorts a set of illuminations by measuring each against the data sources 804, 808, and 812, using the matching subsystem 1018 to compute a match score 1020 for each illumination. Illuminations whose match score is above a threshold associated with each illumination are selected; the selected illuminations are ordered by their match score to form the sorted illumination list.

It should be noted that all of the foregoing testing of illuminations and generation of match scores occurs entirely under the control of the consumer's computer, and thus without the providers of the illuminations having any access to the highly sensitive and private information about the consumer that is contained in the database 804.

In order to describe the illumination matching process in more detail, it is useful to describe the components of an illumination. An illumination 1030 comprises three main components: The content 1032, which will be used if the illumination is selected for display; the Boolean query 1034, which provides for matching against either facts in the database 804 or abstracted data from Boolean abstractor 812; and, model data 1036, further comprising a target vector 1038 and a relevancy vector 1040.

The content 1030 may be any type of displayable content, including text, hypermedia, images, animations, audio, video, and the like.

Accordingly, the Illumination Sorter 816 includes a Boolean Matching 1016 and Metric Matching 1018. The Boolean Matching 1016 evaluates the Boolean query 1034 used to select all illuminations that do meet the query constraints with respect to the facts in the database 804 or abstracted data from the attribute vector 808 via the Boolean Abstractor 812.

Thus, all illuminations for which the Boolean query evaluates to TRUE are selected from the set of illuminations. The meaning of this result is that such illuminations do match facts or data descriptive of the transactions, interests, preferences, or demographics of the consumer whose computer will potentially be selected for display.

Each Boolean query may also be given a "priority," which is used to sort a set of illuminations that only use Boolean queries, and do not use model queries. The priority is generally assigned by the content provider providing the illuminations. Those illuminations with higher priorities will appear earlier in the sorted illumination list. If no data from the attribute vector is used in the matching process, the priority assigned to the query is the match score produced by the matching subsystem.

While Boolean querying alone may be used to select and sort illuminations, it is preferable to employ model data of the consumer model for more fine-grained targeting of illuminations. This is achieved through associating a target vector 1038 with each illumination. This target vector 1038 is then compared by the Metric Matching 1018 to generate a match score, as a function of the distance (in multidimensional attribute space) between the attribute vector 808 of the consumer and the target vector 1038 of an illumination. In one embodiment, the match score is the metric distance between the two vectors; in other embodiments it may be a combination of the measure of the angle between the vectors (as measured from the origin of the multidimensional space) and the measure of the length of the two vectors.

The attribute vector 808 and target vectors 1038 used by the Metric Matching 1018 may be the full vector of attributes (e.g. vector 902 in FIG. 9) or any abstraction of the full vector (e.g., vectors 904 or 906). However, a content provider may be interested in comparing only a selected number of the components of the target vector 1038 with the attribute vector 808 of a consumer. Accordingly, in one embodiment the illumination also contains a relevancy vector 1040, to indicate which elements of the target vector 1038 are important. If an element of the relevancy vector 1040 is set to zero, the attribute represented by the element is of no interest in the matching; if set to 1, it is completely of interest. A relevancy vector value may vary between 0 and 1, indicating that the attribute is of any arbitrary level of interest.

The final match score is computed by the Metric Matching 1018 as a combination (e.g. weighted sum or product) of the priority resulting from the Boolean query, and the distance metric from the target vector 1038 to the consumers attribute vector 808.

With appropriate normalization, the distance metric chosen will have a match score of 1 if the match is perfect, and will asymptotically reach zero as the match becomes poor. Thus, the model score and the Boolean query with priority can be reconciled and sorted in a manner that yields useful results.

3. Updating a Consumer Model

This section describes one embodiment for updating the component elements of the attribute vector 808 in a consumer model. Updating is managed by the mapping subsystem 810.

Each element in the attribute vector 808 represents a consumer preference, interest, psychographic, demographic aspect, or alternatively, the probability the consumer is interested in a specific topic, category, and the like. These attributes are updated as a function of a measure of relevancy of a transaction to each attribute.

A number of different measure of relevancy may be used to update the attribute vector. In one embodiment, the measure of relevancy of a transaction is the conditional probability of the transaction occurring given the consumer's preference, as expressed in a selected attribute. Updating here may be done using Bayesian analysis.

Let $P(x|d)$ denote the probability of x given data d (for example, that a specific event occurred). Let $P(d|x)$ denote the probability of the data (the event occurring), knowing the prior probability x. Let $\sim x$ denote the negative of x. And let $P(d)$ be the a priori probability of data.

Bayes' Theorem states that:

$$P(x|d)=P(d|x)P(x)/P(d)$$

But in the case where $P(d)=P(d|x)P(x)+P(d|\sim x)(1-P(x))$, i.e., the probability of the data is the conditional probability under the case for x or $\sim x$, we get:

$$P(x|d)=P(d|x)P(x)/[P(d|x)P(x)+P(d|\sim x)(1-P(x))]$$

An example using real-world extensions to the variables will make it easy to understand. The probability values are shown in table 1102 of FIG. 11. Consider a case where x indicates an interest in cooking, and the data of interest is a transaction that occurs at Williams-Sonoma, a cooking-oriented store. Then:

P(x)="Degree of (or probability of) interest in cooking"
   A priori value=0.001
   Shown as the top-most value in column 1110 in table 1102 of FIG. 11
~x=not x="Non-interest in cooking"
P(~x)=1−P(x)="Degree of (or probability of) non-interest in cooking"
   Computed value=0.999
d="A transaction at Williams-Sonoma occurs"
   This event triggers the application of Bayesian analysis by the mapping subsystem 810
P(d|x)="Probability of a transaction at Williams-Sonoma occurring given an interest in cooking"
   Assigned a value of 0.1 based on statistical regression of existing data
   Shown in column 1104 in table 1102 of FIG. 11
P(d|~x)="Probability of a transaction at Williams-Sonoma occurring given there is a non-interest in cooking"
   Assigned a value of 0.02 based on statistical regression of existing data
   a Shown in column 1106 in table 1102 of FIG. 11
P(x|d)="Degree of (or probability of) being interested in cooking given a transaction at Williams-Sonoma occurs"
   Value is to be calculated and used as new value of P(x)
   Values are updated in successive rows of column 1110 in table 1102 of FIG. 11

The following code fragments (written in the Java programming language) illustrate one embodiment for Bayesian updating by the mapping subsystem 810. Each attribute in an attribute vector is an instance of class Attribute. This class is defined below, as is the update function for the Attribute:

```
public class Attribute {
    // an attribute has a value. It
    // also has a name by which it can be referenced.
    private double value;
    private String name;
    public boolean update (Transaction txn) {
        // update the value of the attribute according to
        // the Bayesian method. Return true if the value was updated,
        // or false if the value is not updated.
        // First fetch P(d | x) and P(d | ~x) from the database (804)
        // using the fetch method of the Transaction object. This will
        // go out over the net to get the metadata from a metadata
server
        // if it is not cached
        double pdx, pdnx;
        try {
            pdx = txn.fetch("pdx", self);
            pdnx = txn.fetch("pdnx", self);
            // If there is no probability data, the transaction is
            // not relevant to this attribute and no updating is done
        } catch (NoProbabilityDataException e) {return false;}
        // otherwise apply Bayes' updating
        value = (pdx * value) / (pdx * value + pdnx * (1 − value));
        return true;
    }
}
```

The Attribute Vector class contains an array of Attributes. This code fragment illustrates one example of how the attribute vector is updated for all transactions in a report:

```
public class AttributeVector {
    // an array of attributes
    private Attribute attributeArray [ ];
    public void updateAttVector (Report report) {
        // the function txnList returns all transactions on the report
        List txnList = report.txnList( );
        List txns;
        Attribute att;
        // here we loop over each element in the attribute vector
        for (int i=0; i<attributeArray.length; i++) {
            att = attributeArray[i];
            // now, for each txn in the list, we attempt to update.
            while (txns) {
                Transaction txn = (Transaction) head(txns);
                txns = tail(txns);
                att.update(txn);
            }
        }
    }
}
```

FIGS. 11*a* and 11*b* shows the result of an example Bayesian update by the mapping subsystem 810, with the conditional probabilities being used to build up confidence in an attribute. In FIG. 11*a*, table 1102, there is shown an initial value for P(x) to be 0.001 (as indicated in the row specified by transaction number 0 in column 1108), indicating no significant interest in cooking. After four transactions, the value of P(x) in column 1110 rises to 0.385, indicating moderate interest. After eight transactions, P(x) has gone to 0.997, indicating a very strong preference for cooking-related activities.

The ratio of P(d|x) to P(d|~x), as shown in columns 1104 and 1106, determines the speed with which the certainty of interest increases with each transaction that occurs.

FIG. 11*b* illustrates a second example in the table 1112 involves car rental, where the ratio of P(d|x) to P(d|~x), in columns 1114 and 1116, is larger, and the convergence on virtual certainty of interest—P(x) in column 1120—is faster.

The speed with which the certainty of interest changes may be characterized as the velocity of interest. High velocities of interest for any particular preference, attribute, and the like may be used to infer changes in a consumer's interest, and to further infer changes in facts or circumstances about the consumer, such as getting married, having a child, purchasing a car, a home, and the like.

While Bayesian updating allows new information to enter the system, there is no sense of time in the equation. Time is important because transactions that occurred long in the past should have less relevance in determining today's preferences. Thus, the present invention introduces a notion of "decay" in the life of the transaction data, which reduces the influence that older transaction have on the attribute vector 808.

Decay of the influence of older transactions on the attribute vector 808 may be achieved by updating the attribute vector 808 using the conditional probabilities of no transaction occurring during a given period of time. This has the effect of introducing a "non transaction" that occurs when other transactions do not, and updating the attribute vector 808 accordingly.

FIGS. 12*a* and 12*b* illustrates this technique. All probability values are the same as in FIGS. 11*a* and 11*b*, respectively, except for the introduction of two new quantities:

P(n|x)="Probability of no cooking-related transactions occurring given an interest in cooking"
   Assigned a value of 0.9 based on statistical regression of existing data Shown in column 1204 in table 1202 of FIG. 12a P(n|~x)="Probability of no cooking-related transactions occurring given there is a non-interest in cooking"
Assigned a value of 0.98 based on statistical regression of existing data Shown in column 1206 in table 1202 of FIG. 12a Looking at the table 1202 of FIG. 12a, there is shown a Williams-Sonoma transaction in period 1 and another in period 2, where the periods are shown in column 1212. These two transactions yield the same values of P(x)—shown in column 1214—as in the non-decay example of FIG. 11a, namely 0.005 for period 1 and 0.024 for period 2. However, in period 3, there is no Williams-Sonoma transaction, and no other cooking-related transaction. Hence the non-transaction—involving P(n|x) and P(n|~x), shown in columns 1204 and 1206 respectively—is employed, and the attribute vector 808 is updated during this period with the appropriate probabilities for the non-transaction. This non-transaction has the effect of reducing the probability estimation for interest in cooking.

Interest again rises with another Williams-Sonoma transaction in period 4, and again in period 5. But periods 6 and 7 lead to a decline in the probability of interest in cooking, and period 8 (with a Williams-Sonoma transaction) again leads to an increase.

The code fragment relevant to updating the entire Attribute Vector based on the use of Bayesian updates, including the use of the "non transaction" for implementing decay is as follows. Note that the method update AttVector has been altered to accept as arguments a Period as well as the Report:

```
public class AttributeVector {
    // an array of attributes
    private Attribute attributeArray [ ];
    public void updateAttVector (Report report, Period period) {
        // the method txnList returns all transactions on the report
        // that occur within the specified period
        List txnList = report.txnList(period);
        List txns;
        Attribute att;
        boolean updateApplied;
        // here we loop over each element in the attribute vector
        for (int i=0; i < attributeArray.length; i++) {
            att = attributeArray[i];
            // now, for each txn in the list, we attempt to update.
            // If we do update, we note
            // that a transaction update has been applied
            updateApplied = false;
            while (txns) {
                Transaction txn = (Transaction) head(txns);
                txns = tail(txns);
                // update and change updateApplied to be true if there
                // really was an update.
                updateApplied = att.update(txn) || updateApplied;
            }
            // if no updates were done, then we apply the
            // non-transaction to decay the probability value
            if (!updateApplied) {
                att nonTransaction ( );
            }
        }
    }
}
```

The class Attribute also has a new method to apply the non-transaction. This is shown in the revised code fragment below:

```
public class Attribute {
    // an attribute has a value. It
    // also has a name by which it can be referenced.
    private double value;
    private String name;
    public boolean update (Transaction txn) {
        // update the value of the attribute according to
        // the Bayesian method. Return true if the value was updated,
        // or false if the value is not updated.
        // First fetch P(d | x) and P(d | ~x) from the database (804)
        // using the fetch method of the Transaction object. This will
        // go out over the net to get the metadata from a metadata
        server
        // if it is not cached
        double pdx, pdnx;
        try {
            pdx = txn.fetch("pdx", self);
            pdnx = txn.fetch("pdnx", self);
            // If there is no probability data, the transaction is
            // not relevant to this attribute and no updating is done
        } catch (NoProbabilityDataException e) {return false;}
        // otherwise apply Bayes' updating
        value = (pdx * value) / (pdx * value + pdnx * (1 - value));
        return true;
    }
}
public void nonTransaction ( ) {
    // update the value of the attribute according to
    // the Bayesian method, using the non-transaction metadata.
    // This will go out over the net to get the metadata from a
    // metadata server if it is not cached
    // fetch index "pntx" is the probability of a non-transaction
    // given x;
    // "pntnx" is the probability of a non-transaction given not x
    double pntx, pntnx;
    try {
        pntx = att.fetch("pntx", self);
        pntnx = att.fetch("pntnx", self);
        // If there is no probability data, the transaction is
        // not relevant to this attribute and no updating is done
    } catch (NoProbabilityDataException e) {return;}
    // otherwise apply Bayes' updating
    value = (pntx * value) / (pntx * value + pntnx * (1 - value));
}
```

The table 1220 in FIG. 12b shows that again, the ratio of the value of P(n|x) to P(n|~x)—columns 1222 and 1224—controls the rate at which confidence decays. These values are determined from statistical regression on existing data sets.

The values of P(d|x) and P(d|~x) are metadata associated with each combination of attribute of the attribute vector 808 and transaction owner, and the values of P(n|x) and P(n|~x) are metadata associated with each element of the attribute vector 808, and potentially with specific groups of transaction owners. A transaction owner is an entity with which the transaction is associated in the database 804, such as a merchant for a financial transaction, or a web site for a URL history list. The a priori probability values may be determined by statistical analysis of large amounts of blinded data, but are then used to refine specific consumer models.

In these examples, the value of P(d|x) and P(d|~x) are not shown as having any dependency on the dollar value of the transaction. This need not be the case. The probabilities can be arbitrary functions of the transaction, including the owner of the transaction, the amount of the transaction, and other transaction data.

When the aggregated attributes from the attribute vector 808 are involved, the aggregated value is a weighted and normalized sum of a number of attribute values. FIGS. 13a and 13b depicts tables showing conditional probability metadata for the following transactions:

P(s|x)="Probability of a transaction at Sportsmart occurring given an interest in sports"

Assigned a value of 0.1 based on statistical regression of existing data

Shown as column 1306 in table 1302 of FIG. 13a

P(s|~x)="Probability of a transaction at Sportsmart occurring given there is a non-interest in sports"

Assigned a value of 0.02 based on statistical regression of existing data

Shown as column 1308 in table 1302 of FIG. 13a

P(v|x)="Probability of a transaction at VolleyBallWorld occurring given an interest in volleyball"

Assigned a value of 0.25 based on statistical regression of existing data

Shown as column 1310 in table 1302 of FIG. 13a

P(n|~x)="Probability of a transaction at VolleyBallWorld occurring given there is a non-interest in volleyball"

Assigned a value of 0.01 based on statistical regression of existing data

Shown as column 1312 in table 1302 of FIG. 13a

P(n|x)="Probability of no sports-related transactions occurring given an interest in sports"

Assigned a value of 0.9 based on statistical regression of existing data

Shown as column 1314 in table 1302 of FIG. 13a

P(n|~x)="Probability of no sports-related transactions occurring given there is a non-interest in sports"

Assigned a value of 0.98 based on statistical regression of existing data

Shown as column 1316 in table 1302 of FIG. 13a

Table 1302 shows the result of three periods of transaction activity. The initial probabilities of interests in the various sports (shown in column 1304) are all set to 0.10 in column 1318. The next column, 1320, shows the values of all the probabilities after a transaction at Sportsmart, which can not be attributed to any specific sport, and so has a moderate effect on all variables $x_1$ through $x_5$. The last value in column 1320 is the value for x, the indicator of general interest in sports; it is simply the average of the values of $x_1$ through $x_5$.

Column 1322 shows how all those probabilities decrease in period 2, where no sports-related transaction occurs. Then, in period 3, a transaction occurs at VolleyBallWorld. This is shown in column 1324. Note that non-volleyball sports have had their probabilities reduced, while the volleyball preference increased. The value of x also increased significantly.

In FIG. 13b, table 1332 shows the result of three periods of transaction activity involving the same set of transactions in a different order. Again, the initial probabilities of interests in the various sports (shown in column 1334) are all set to 0.10 in column 1348. The next column, 1350, shows the values of all the probabilities after a transaction at VolleyBallMart, which causes the value of $x_4$ to increase to 0.202 while all other values in column 1350 decrease slightly to 0.009. Again, the last value in column 1350 is the value for x, the indicator of general interest in sports; it is the average of the values of $x_1$ through $x_5$.

Column 1352 shows how all probabilities decrease in period 2, where no sports-related transaction occurs. Then, in period 3, a transaction occurs at Sportsmart. This is shown in column 1354. Note that all sports have had their probabilities increased, and value of x also has increased significantly.

The weighted sum x tracks the general interest in sports, and can be used as an aggregate attribute in the attribute vector for content providers who wish to target information to consumers interested in sports in general, without regard to specific sports. Items such as sports nutrition products and general condititioning information would fall into such a category.

Content providers who wished to target a specific sport could match their illuminations against the more specific sport subcategories. This would be of interest to a merchant advertising a tennis magazine, for example.

While a preferred embodiment uses Bayesian updating methods, updating of attribute vectors may be done with any variety of techniques, including exponential decay, wavelets, Gaussian combination, and the like.

Once the concept of time dependence is incorporated into the attribute vector 808 as described above, it is apparent that the Boolean Abstractor 812 is a very powerful tool for directing targeted content to appropriate consumers. Queries on a conventional database (for example, using the SQL language) cannot easily capture a consumer's interest in a particular area, unless there is a very explicit mapping between specific interests and specific transactions. But in practice, it is impossible to provide sufficient mappings between the transactions of a consumer and all of the possible interests and attributes that such transactions may evidence.

In the present invention however, a particular value of an attribute in the attribute vector 808 may be derived from any number of transactions of very different types that occur over time or behaviors of the consumer. The present value of the specific attribute depends not only on these interrelated transactions, but also on their time dependence.

Interest in golf, for example, may be indicated, by transactions at a golfing-oriented sports store, a vacation purchased from a golf-related vacations company, subscriptions to golf magazines, visiting golf-related Web sites, as well as by purchases at more general sporting goods stores and travel to cities which have famous golf courses. It would be nearly impossible for a content provider to craft a query golf-interest? that could examine all transactions in a conventional database and determine the complex combination of supporting or detracting evidence that has accumulated over time from a series of purchases. Yet in the present invention, a single "golf interest" attribute in the attribute vector 808 may be defined, and updated from an arbitrarily complex sequence of transactions and consumer actions, thereby capturing in a single attribute the level of the consumer's interest in golf. Accordingly, it then becomes a simple matter to construct a Boolean query that determines the value of the golf-interest attribute to see if its value exceeds a threshold.

Combinations of thresholds, such as interest in San Francisco and interest in football, provide even more useful targeting via the Boolean Abstractor 812. Such custom queries can be written simply and easily by a content provider using the Boolean Abstractor; they would be nearly impossible to write in SQL since the content provider would not have any way of determining all of the possible transactions and consumer behaviors that might evidence an interest in a specific area.

O. Example Applications of Hierarchical Attribute Vectors

1. Content Rotator

Figure 14:
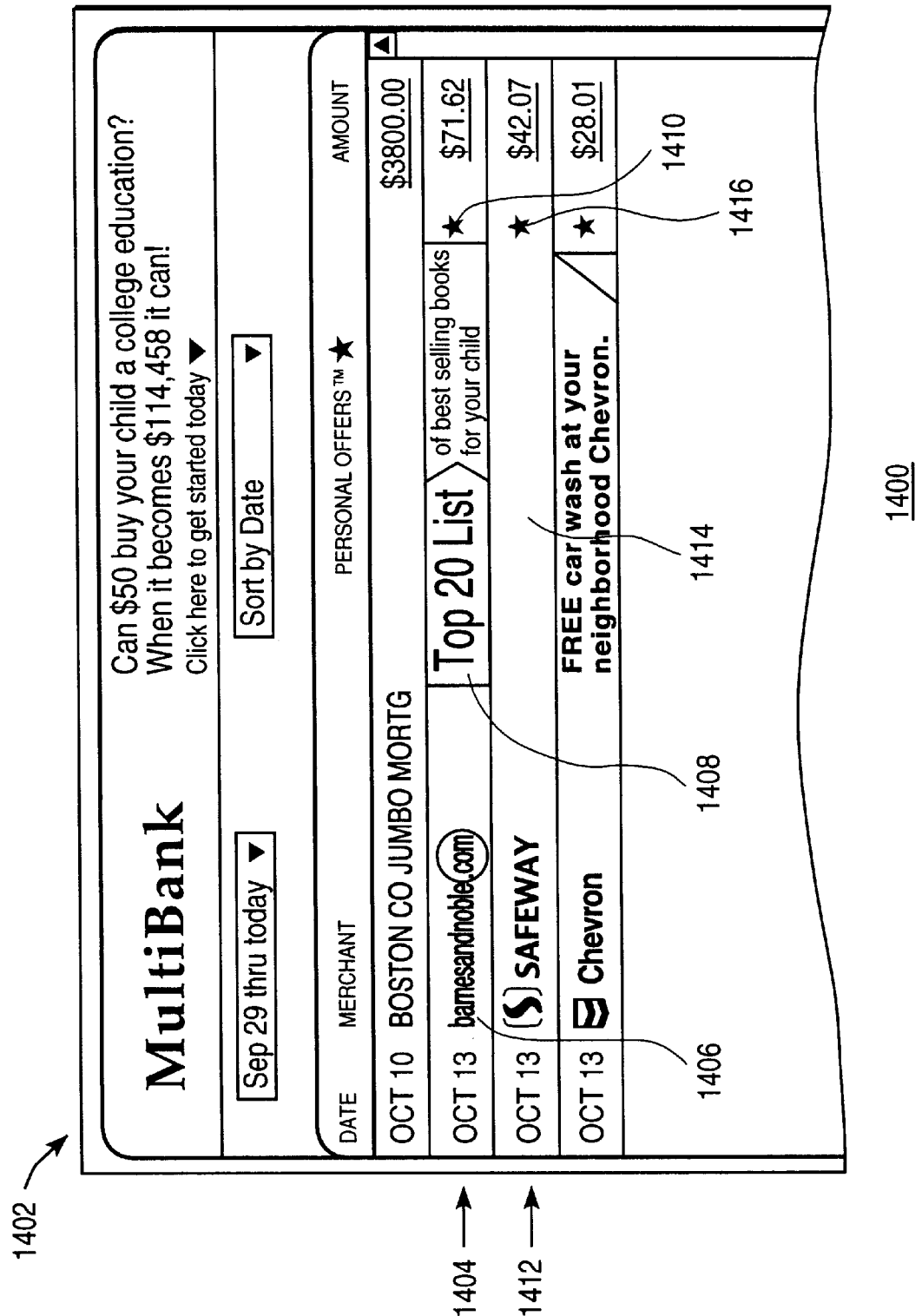
FIG. 14 is an illustration of an illuminated credit card statement with the content rotator.

FIG. 14 depicts one embodiment of a method for displaying targeted content according to the results of sorting a group of illumination candidates. The figure depicts a portion of credit card statement 1402 from MultiBank that is delivered electronically to a consumer's computer via a network, such as the Internet, and viewed on the consumer's computer.

The credit card statement contains a number of statement lines, each including a date, a merchant identifier, advertising space, and an amount. The advertising space is controllable by the merchant to provide an ordered sequence of illuminations, as determined by the Illumination Sorter 816.

For example, in statement line 1404, the merchant 1406 is barnesandnoble.com. The merchant has some advertising space available, which contains content 1408 (here an advertisements) for "Top 20 list of best selling books for your child". This content is from an ordered set of illuminations, which have been included in, or are accessible from, the data that is used to construct the credit card statement. This particular content was deemed to be the most appropriate for this consumer, as a result of the illumination sorting process. However, there are other applicable content of this merchant that were also selected by the illumination process, that is having target vectors or Boolean queries that matched attributes or facts of the consumer. However, given the limited space on the credit card statement that is allocated to each merchant, there is insufficient space for concurrently displaying all of the content. This problem of how to display multiple illuminations is solved by using the content rotator 1410, as indicated by the "star" graphic. Other graphical indicia may also be used, such as icon buttons, hyperlinks, changing cursor icons, and the like.

Figure 15:
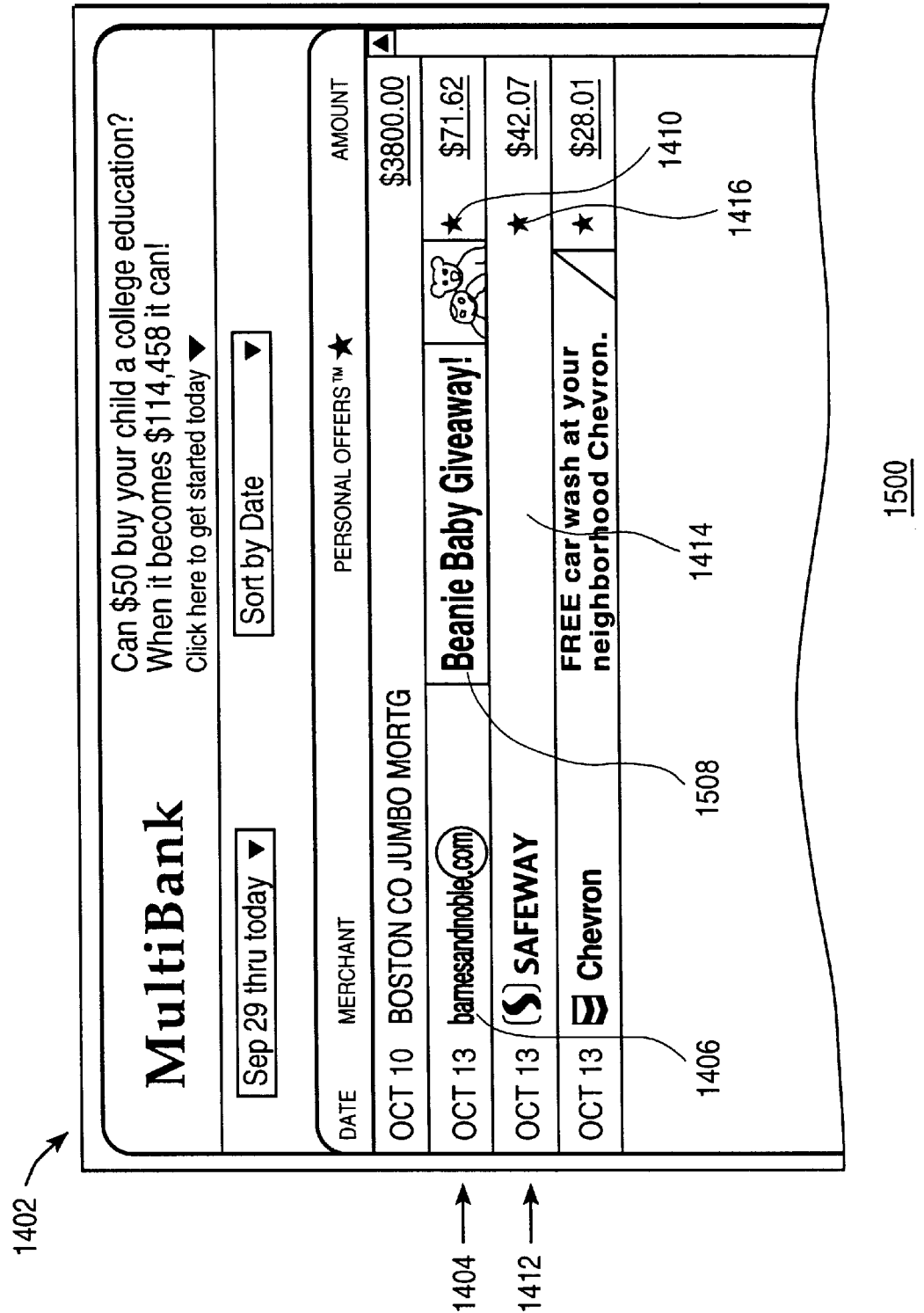
FIG. 15 is another illustration of the illuminated credit card statement after activation of the content rotator.

When the consumer clicks on the content rotator 1410, a new content item may appear; this is shown in FIG. 15, where content 1508 has now appeared. Additional clicks on the content rotator 1410 will cycle through the selected illuminations for this statement line 1414. Various presentation orders may be used to determine the sequence in which the illuminations appear. In one embodiment, the content items are presented in random order. Another embodiment recognizes the value of screen real estate and thereby presents the content items in the order most likely to interest the consumer; i.e., in the order as specified by the Illumination Sorter 816. Other presentation orders may also be used.

The content rotator 1410 is also useful in implementing the illumination policies of the statement provider, while still allowing the consumer to receive offers of value via the content items. For example, in FIG. 14, line 1412 of the consumer's statement has a blank area 1414 where a content item from the illumination process could have been placed. This content item may not have been shown because MultiBank, as owner of the credit card statement, may have wanted to keep a large fraction of the statement lines unilluminated. Accordingly, MultiBank defined a policy to effect this requirement, for example by allowing only less than a certain percentage of statement lines to be illuminated, or allowing a selected list of merchants to illuminate their statement lines. But the content rotator 1416 on this line informs the consumer that there is at least one content item available if he clicks on the content rotator 1416.

Figure 16:
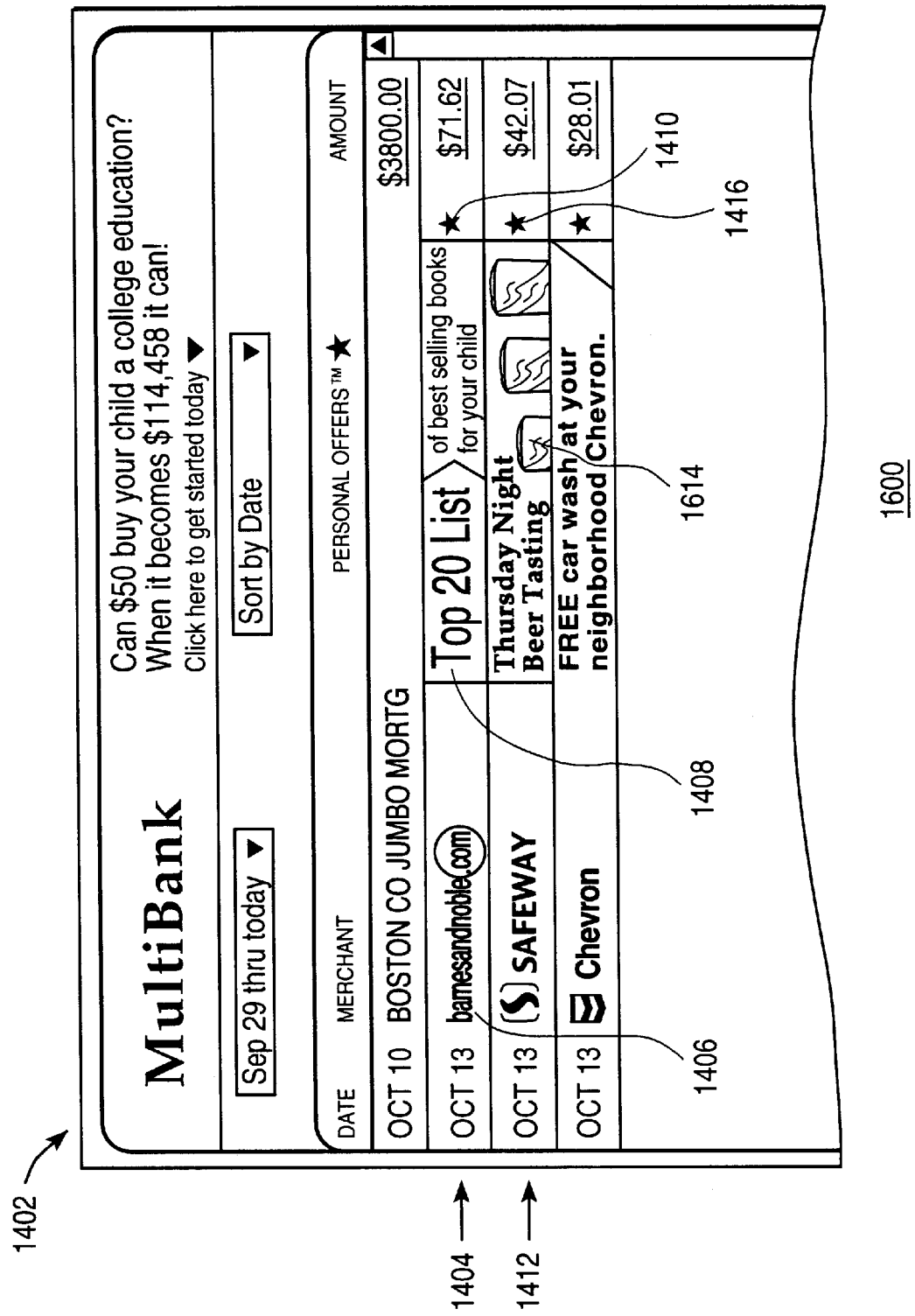
FIG. 16 is another illustration of the illuminated credit card statement after activation of the content rotator.

When the consumer clicks on the content rotator 1416, the screen changes to look like FIG. 16. In this figure, the statement line 1412 now has an content 1614 where the blank space used to be. Again, continued clicking on the content rotator 1416 will cycle through the selected illuminations for this particular statement line 1412.

In each of the foregoing, repeated clicking on the content rotator retrieves the particular selected illuminations that are associated with the merchant for that statement line. Thus a single credit card statement, with, for example, ten transaction lines, each having a set of five illuminations would present 50 illuminations to the consumer, available on a merchant by merchant basis simply by clicking on the content rotator associated with each statement line.

While the foregoing examples of the content rotator are illustrated using a credit card statement with a set of merchants, each controlling a portion of the statement, the content rotator may be used in the context of any document transmitted to the consumer's computer, with one or more portions of the document associated with a number of potential illuminations that are selected by the Illuminations Sorter 816. Each such portion may be owned by a different entity, which specifies the set of potential illuminations for the portion, and hence the underlying content, Boolean query, target and relevancy vectors. In this manner, the document, when presented to the consumer, will be customized with the selected illuminations from a number of different content providers. Thus, the present invention extends customization of information from a single document to an entire hypermedia collection, and thereby extends from the purely spatial dimensions of the display device to an additional dimension defined by the relevancy of content to the consumer's profile. The content rotator provides the navigational tool by which the consumer traverses this customized hypermedia collection.

2. Hierarchical Discrimination of Content

A content provider may have a very rich set of illuminations that may be targeted to very specific types of consumers on the basis of their attributes vectors. However, the richness of this set makes it difficult for the content provider to select which illuminations to provide in a document being transmitted to a consumer for matching against that consumer's profile.

For example, FIG. 14 the merchant in line 1404 is a bookseller vending a large variety of different types of books. Further, assume that the attribute vector 808 includes a "children" aggregate attribute that is an aggregate of a number of more specific attributes, such as "infant/ preschool," "young school age," "middle schoolers," and "high schoolers."

However, because the merchant on line 1404 can only send a few candidate illuminations (say, no more than 8) due to bandwidth or other limitations, it cannot transmit illuminations that target all the specific categories children's books plus all the categories of cookbooks, travel books, and so forth.

Therefore, the merchant chooses to make use of the hierarchical structure of the attribute vector to effect a hierarchical discrimination of its content. The first illumination candidates transmitted to the consumer's computer cover the broad areas of cooking, travel, sports, automotive, children, crafts, computers, and school. These illuminations will be processed by the Illumination Sorter 816 to determine which categories are most relevant to the consumer. The most relevant illumination will be displayed initially in the illuminated document, with the selected ones of the remaining illumination candidates available to the consumer via the content rotator, and ordered by their relevancy (e.g. match scores).

From this list, assume that the illumination for the "children" attribute is selected as the best match with the consumer. Indeed it may well be that the consumer has a new infant, but the merchant does not know this fact at the time the illumination is selected or presented to the consumer, because, as noted above, the illuminations are selected without their provider having any explicit access to the facts or model of the consumer.

When the consumer clicks on the content item 1408 ("Top 20 List of best selling books for your child"), the merchant's server receives an explicit request for children's books. This request is then used to select a more specific set of potential illuminations to send to the consumer's computer. In effect, the merchant is now aware of the consumer's interest in children's books (as this information has been volunteered by the consumer when he clicked on the content item 1408), but still does not know which sub-category of children is appropriate. Thus, the second set of candidate illuminations is directed to specific sub-categories within the children category (infant/preschool, young school age, middle schoolers, and high schoolers), and includes target vectors 1036 containing attributes corresponding to these specific sub-categories. The relevancy vectors 1038 is also set to restrict interest to only these attributes.

Figure 17:
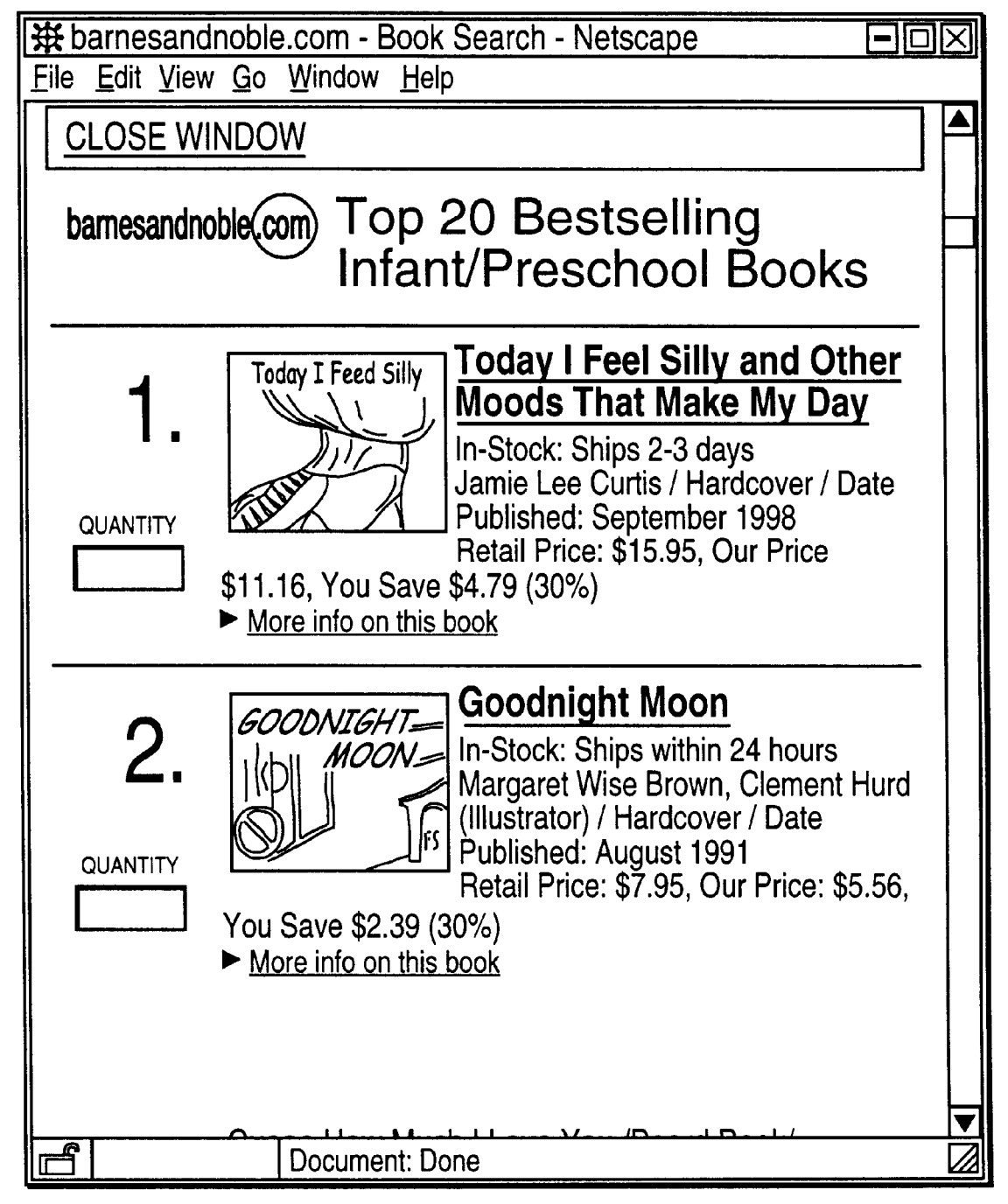

Using this second set of illuminations, the Illumination Sorter 816 now matches these target vectors 1036 to the consumer's attribute vector 808. The infant/preschool category is found to have the highest match with the consumer's attribute vector, and the content shown in FIG. 17 is displayed, here as a separate window, instead of in the statement line.

Figure 18:
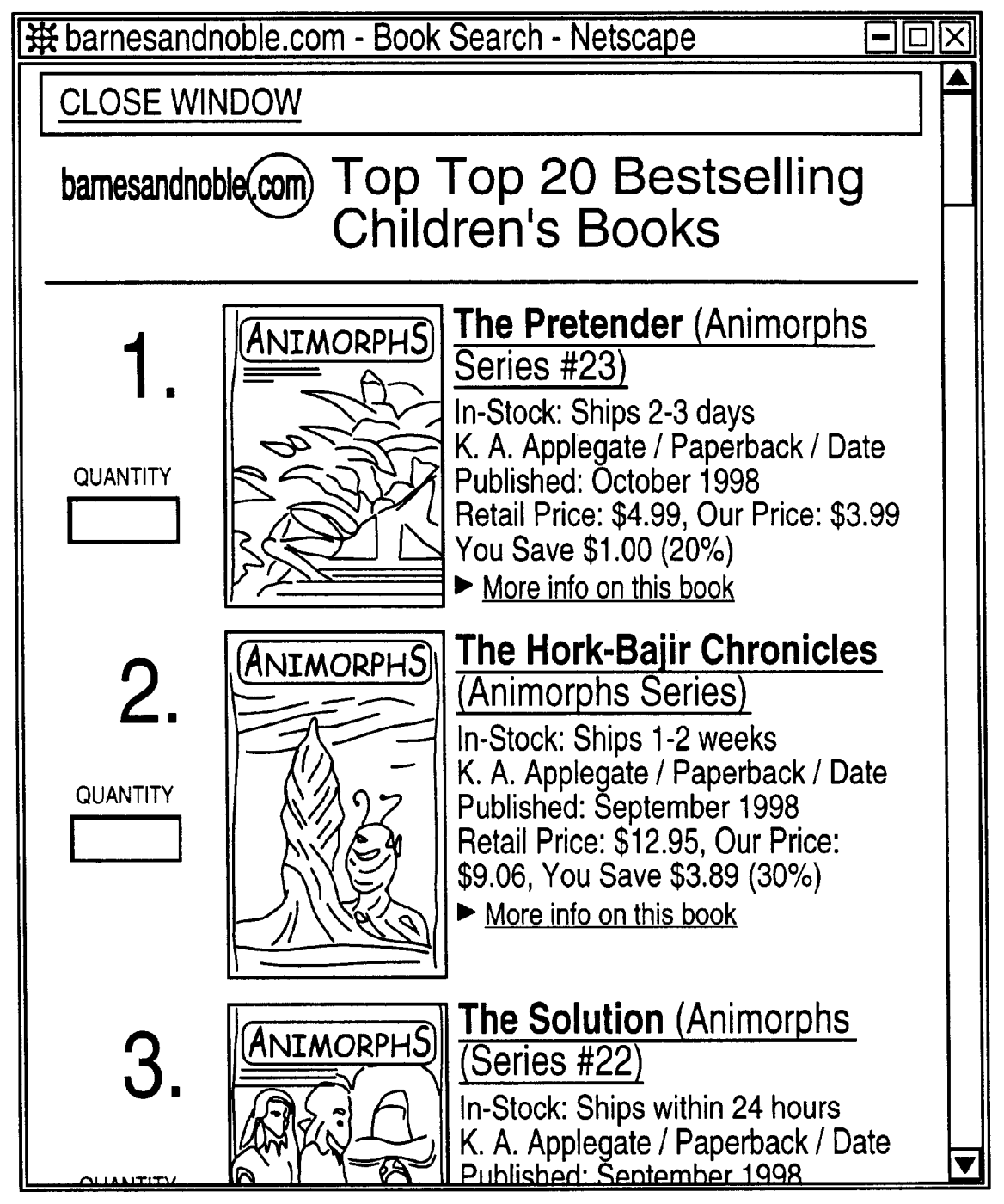

A second consumer, in a different household may see the same content 1408 on his statement, and may also click on it. But in that consumer's lower level attribute vector 808, the "young school age" sub-category may be the best match, so the content which is displayed from all the conditional illuminations is different, as shown in FIG. 18.

This process of hierarchical discrimination may be repeated any number of times, thus providing for a very high degree of targeting without requiring any a priori knowledge about the particular consumer (e.g., without having to rent lists of consumer profiles tied to IP addresses, or storing a cookie in the consumer's browser). In addition, the consumer's privacy is assured (in particular the details of the database 804 and attribute vector 808 ), as the only information going back to the merchant (or other content provider) is the information contained in the click on the content, as performed consciously and willingly by the consumer.

This discussion has assumed that the content provider has a static set of content items that are to be chosen from. However, that need not be the case. Parameterized content could make use of data in the consumer model to fill in portions of the content itself. In such as case, content such as content 1408 in FIG. 14 could be tailored to say "Top 20 list of best selling books for your infant" or "Top 20 list of best selling books for your young adult" where the italicized components are selected from the best matching attribute in the attribute vector 808.

We claim:

1. A method of customizing a structured document delivered electronically to a consumer computer, the consumer computer including a display device, the method comprising:

receiving a structured document at the consumer computer, the structured document including a plurality of variable content sections, each variable content section having a plurality of selectable content alternatives;

for each variable content section, selecting a subset of the content alternatives for augmenting the section by evaluating the content alternatives with respect to a consumer profile of the consumer, ordering the subset of content alternatives into an order including a first content alternative, and augmenting the section with the first content alternative;

presenting the augmented structured document to the consumer on the display device with the first content alternative for each variable content section; and enabling retrieval of the remaining content alternatives for each variable content section.

2. The method of claim 1, further comprising:

ordering the selected content alternatives for a variable content section by a function of their relevancy to the consumer profile.

3. The method of claim 1, further comprising:

presenting, in response to an action by the consumer with respect to one of the variable content sections, at least one of the remaining content alternatives for the variable content section.

4. The method of claim 1, further comprising:

presenting, in response to an action by the consumer with respect to one of the variable content sections, at least one of the remaining content alternatives for the variable content section in place of the first content alternative for the variable content section.

5. The method of claim 1, wherein evaluating the content alternatives with respect to a consumer profile of the consumer further comprises:

comparing a target vector of attributes associated with a content alternative with a vector of attributes associated with the consumer profile.

6. The method of claim 5, further comprising:

selecting at least one attribute from the target vector using a relevancy vector comprising relevancy values corresponding to at least one attribute of the target vector; and comparing only those attributes of the target vector for which the relevancy values exceed a threshold.

7. The method of claim 6, wherein the relevancy value determines a relative importance of attributes of the target vector.

8. The method of claim 1, wherein evaluating the content alternatives with respect to a consumer profile of the consumer further comprises:

evaluating a Boolean query with respect to facts derived from transactions of the consumer.

9. The method of claim 1, wherein evaluating the content alternatives with respect to a consumer profile of the consumer further comprises:

evaluating a Boolean query with respect to logical abstractions derived from an attribute vector describing attributes of the consumer.

10. The method of claim 1, wherein the consumer profile includes a consumer attribute vector, comprising:

a base vector comprising a plurality of base level attributes of the consumer, each base level attribute having a value; and at least one hierarchical vector comprising at least one aggregate attribute associated with a plurality of base level attributes of the base level vector, and having a value computed as a function of the values of the associated base level attributes.

11. A method of selecting content for presentation to a consumer, comprising:

storing a consumer model of the consumer including an attribute vector having a plurality of attributes of the consumer;

receiving a document associated with a plurality of selectable content alternatives, each selectable content alternative associated with a target vector representing expected attributes of a consumer;

receiving in association with each target vector a relevancy vector including a plurality of relevancy values, each relevancy value associated with at least one attribute of the target vector, the relevancy value indicating a measure of relevancy of the associated attribute of the target vector;

scaling the attributes of the target vector by the relevancy value associated with each attribute;

comparing the attribute vector of the consumer with at least one of the scaled target vectors to determine a distance measure between the target vectors and the attribute vector;

selecting at least one of the content alternatives as a function of the distance measure; and presenting the selected at least one content alternative to the consumer.

12. The method of claim 11, further comprising:

receiving in association with at least one of the plurality of selectable content alternatives a query with respect to at least one attribute of the attribute vector of the consumer; and evaluating the query against the attribute vector of the consumer to determine whether the content alternative may be selected for presentation to the consumer.

13. The method of claim 12, wherein the query includes a priority value, and selecting at least one of the content alternatives as a function of the distance measure further comprises:

computing a match score for each content alternative as a function of the distance measure between the target vector associated with the content alternative and the attribute vector of the consumer, and the priority value of a query associated with the content alternative; and selecting the content alternative with a highest match score.

14. The method of claim 11, wherein the consumer model comprises:

a base vector comprising a plurality of base level attributes of the consumer, each base level attribute having a value; and at least one hierarchical vector comprising at least one aggregate attribute associated with a plurality of base level attributes of the base level vector, and having a value computed as a function of the values of the associated base level attributes.

15. A method of updating a model of consumer attributes, comprising:

retrieving a plurality of transactions;

determining a measure of relevancy of each transaction to at least one attribute of a consumer responsive to a conditional probability of each transaction occurring given a value of the attribute; and updating the at least one attribute as a function of the relevancy of each of the plurality of transactions.

16. The method of claim 15, wherein updating the at least one attribute is performed using Bayes Theorem using the conditional probability of each transaction.

17. The method of claim 15, wherein updating the at least one attribute further comprising:

assigning each transaction to a time period in an ordered sequence of time periods;

for any time period to which no transaction is assigned, establishing a measure of relevancy for the attribute for no transaction occurring within the time period; and updating the at least one attribute according to the ordered sequence of time periods, using the measures of relevancy of transactions in time periods in which the transactions occur, and the established measure of relevancy for the attribute for time periods in which no transactions occur.

18. The method of claim 17, wherein determining a measure of relevancy of each transaction comprises determining the conditional probability of each transaction occurring given a value of the attribute.

19. The method of claim 17, wherein updating the at least one attribute is performed using Bayes Theorem using the conditional probability of each transaction.

20. The method of claim 15, wherein the measure of relevancy of a transaction is a function of a monetary amount associated with the transaction.

21. The method of claim 15, wherein the measure of relevancy of a transaction is a function of at least one party to the transaction.

22. A method of selecting content for presentation to a consumer, the consumer associated with a consumer model describing attributes of the consumer, the content delivered electronically to a consumer computer, the consumer computer including a display device, the consumer associated with a consumer profile including a plurality of attributes of the consumer including at least one aggregated attributed having a value computed from a plurality of other attributes, the method comprising:

receiving a structured document at the consumer computer, the structured document including a variable content section having a first set of content alternatives;

selecting a first content alternative for augmenting the section by evaluating attributes of the content alternatives as a function of corresponding attributes of the consumer profile of the consumer and ordering the first set of content alternatives into an order including the first content alternative;

presenting the structured document with the first content alternative on the display device;

receiving a consumer action indicating selection of the first content alternative;

sending in response to the consumer action a second set of variable content alternatives, including a content alternative having an attribute that contributes to an aggregate attribute of the first content alternative;

selecting a second content alternative by evaluating the attributes of second set of content alternatives as a function of corresponding attributes of the consumer profile of the consumer and ordering the second set of content alternatives into an order including the second content alternative; and presenting the structured document with the second content alternative on the display device.

23. A method of customizing a structured document, the structured document including a plurality of variable content sections, each variable content section having a plurality of selectable content alternatives, the structured document electronically delivered to a consumer computer, the consumer computer including a display device, the method comprising:

for each variable content section, selecting a subset of the content alternatives for augmenting the section by evaluating the content alternatives with respect to a consumer profile of the consumer, ordering the subset of content alternatives into an order including a first content alternative, and augmenting the section with the first content alternative;

presenting the augmented structured document to the consumer on the display device with the first content alternative for each variable content section; and enabling presentment to the consumer on the display device of the remaining content alternatives for each variable content section.

24. The method of claim 23, further comprising:

ordering the selected content alternatives for a variable content section by a function of their relevancy to the consumer profile.

25. The method of claim 23, further comprising:

presenting, in response to an action by the consumer with respect to one of the variable content sections, at least one of the remaining content alternatives for the variable content section.

26. The method of claim 23, further comprising:

presenting, in response to an action by the consumer with respect to one of the variable content sections, at least one of the remaining content alternatives for the variable content section in place of the first content alternative for the variable content section.

27. The method of claim 23, wherein evaluating the content alternatives with respect to a consumer profile of the consumer further comprises:

comparing a target vector of attributes associated with a content alternative with a vector of attributes associated with the consumer profile.

28. The method of claim 27, further comprising:

selecting at least one attribute from the target vector using a relevancy vector comprising relevancy values corresponding to at least one attribute of the target vector; and comparing only those attributes of the target vector for which the relevancy values are exceed a threshold.

29. The method of claim 28, wherein the relevancy value determines a relative importance of attributes of the target vector.

30. The method of claim 29, wherein evaluating the content alternatives with respect to a consumer profile of the consumer further comprises:

evaluating a Boolean query with respect to facts derived from transactions of the consumer.

31. The method of claim 23, wherein evaluating the content alternatives with respect to a consumer profile of the consumer further comprises:

evaluating a Boolean query with respect to logical abstractions derived from an attribute vector describing attributes of the consumer.

32. The method of claim 23, wherein the consumer profile includes a consumer attribute vector, comprising:

a base vector comprising a plurality of base level attributes of the consumer, each base level attribute having a value; and at least one hierarchical vector comprising at least one aggregate attribute associated with a plurality of base level attributes of the base level vector, and having a value computed as a function of the values of the associated base level attributes.

* * * * *